US012323021B2

(12) United States Patent
Wakabayashi et al.

(10) Patent No.: US 12,323,021 B2
(45) Date of Patent: Jun. 3, 2025

(54) VIBRATION GENERATION DEVICE, VIBRATION REDUCTION DEVICE, AND ELECTRONIC APPARATUS

(71) Applicant: SEIKO EPSON CORPORATION, Tokyo (JP)

(72) Inventors: Shinichi Wakabayashi, Suwa (JP); Tatsuya Takahashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 204 days.

(21) Appl. No.: 18/175,626

(22) Filed: Feb. 28, 2023

(65) Prior Publication Data

US 2023/0275497 A1 Aug. 31, 2023

(30) Foreign Application Priority Data

Feb. 28, 2022 (JP) ................. 2022-029123

(51) Int. Cl.
*H02K 33/18* (2006.01)
*B06B 1/04* (2006.01)
*H02K 7/02* (2006.01)

(52) U.S. Cl.
CPC ............ *H02K 33/18* (2013.01); *B06B 1/045* (2013.01); *H02K 7/02* (2013.01); *B06B 2201/30* (2013.01)

(58) Field of Classification Search
CPC . H02K 33/18; H02K 7/02; H02K 7/06; B06B 1/045; B06B 2201/30
See application file for complete search history.

(56) References Cited

U.S. PATENT DOCUMENTS

| 2002/0167239 | A1* | 11/2002 | Long | H02K 7/06 310/152 |
| 2015/0098130 | A1* | 4/2015 | Terajima | H04N 23/685 359/557 |
| 2019/0304650 | A1 | 10/2019 | Takahashi et al. | |
| 2021/0218324 | A1 | 7/2021 | Hashimoto et al. | |
| 2021/0273543 | A1* | 9/2021 | Takahashi | H02K 33/18 |

FOREIGN PATENT DOCUMENTS

| JP | 2019-180168 A | 10/2019 |
| JP | 2020-006344 A | 1/2020 |
| JP | 2021109165 A | 8/2021 |

* cited by examiner

*Primary Examiner* — Cortez M Cook
(74) *Attorney, Agent, or Firm* — Dority & Manning, P.A.

(57) ABSTRACT

A vibration generation device includes: a base configured to transmit vibration to an object; a pendulum supported by the base swingably around a rotation axis; and a driving unit including a magnet, and a coil disposed to face the magnet in a non-contact manner, and configured to swing the pendulum. One member of the magnet and the coil is provided at a position on the pendulum away from the rotation axis. The base includes a support portion supporting the pendulum swingably around the rotation axis. A part of an extension surface of a facing surface of the support portion facing the pendulum is included in a swingable range of the pendulum. The support portion is provided outside the swingable range of the pendulum when viewed along the rotation axis.

20 Claims, 23 Drawing Sheets

VIBRATION GENERATION DEVICE, VIBRATION REDUCTION DEVICE, AND ELECTRONIC APPARATUS

The present application is based on, and claims priority from JP Application Serial Number 2022-029123, filed Feb. 28, 2022, the disclosure of which is hereby incorporated by reference herein in its entirety.

BACKGROUND

1. Technical Field

The present disclosure relates to a vibration generation device, a vibration reduction device, and an electronic apparatus.

2. Related Art

In the related art, for example, as disclosed in JP-A-2021-109165, a vibration actuator that implements a vibration function of an electronic apparatus is known.

The vibration actuator disclosed in JP-A-2021-109165 includes a fixed body and a movable body that is supported by the fixed body to swing around a shaft portion provided at the fixed body. The movable body is movably supported by the fixed body via a magnetic spring implemented based on an attractive force of a magnet. The movable body includes a core that is a magnetic body and a coil that is wound around the core. Currents of different frequencies flow through the coil, and the movable body moves around the shaft portion which is inserted through a through hole of the core. A flexible substrate that supplies electric power to the coil is provided at one end portion of the core.

The fixed body is formed by combining a base plate and a case. The fixed body includes the magnet and a buffer portion. The magnet can move the movable body in cooperation with the coil of the movable body. A free end of the movable body that vibrates comes into contact with the buffer portion. Accordingly, vibration of the movable body can be transmitted to a housing of the vibration actuator, and the buffer portion can generate large vibration.

However, in the vibration actuator disclosed in JP-A-2021-109165, since a free end of the movable body comes into contact with the buffer portion when the movable body swings, there is a problem in that noise is likely to occur, and since it is difficult to increase a swing stroke of the movable body, it is difficult to generate large vibration.

Therefore, there is a demand for a configuration capable of generating large vibration while preventing generation of noise.

SUMMARY

A vibration generation device according to a first aspect of the present disclosure includes: a base configured to transmit vibration to an object; a pendulum supported by the base swingably around a rotation axis; and a driving unit including a magnet, and a coil disposed to face the magnet in a non-contact manner, and configured to swing the pendulum. One member of the magnet and the coil is provided at a position on the pendulum away from the rotation axis. The base includes a support portion supporting the pendulum swingably around the rotation axis. A part of an extension surface of a facing surface of the support portion facing the pendulum is included in a swingable range of the pendulum. The support portion is provided outside the swingable range of the pendulum when viewed along the rotation axis.

A vibration generation device according to a second aspect of the present disclosure includes: a base configured to transmit vibration to an object; a pendulum supported by the base swingably around a rotation axis; and a driving unit including a magnet, and a coil disposed to face the magnet in a non-contact manner, and configured to swing the pendulum. One member of the magnet and the coil is provided at a position on the pendulum away from the rotation axis. The base includes a support portion supporting the pendulum swingably around the rotation axis, and an avoidance portion, configured to avoid contact with an opposite-side free end of the pendulum from the rotation axis when the pendulum swings, on the free end side.

A vibration generation device according to a third aspect of the present disclosure includes: a base configured to transmit vibration to an object; a pendulum supported by the base swingably around a rotation axis; and a driving unit including a magnet, and a coil disposed to face the magnet in a non-contact manner, and configured to swing the pendulum. The base includes a support portion supporting the pendulum. One member of the magnet and the coil is provided at a tip end portion of the pendulum in an extending direction of the pendulum from the rotation axis. The tip end portion is located outside the support portion when viewed from a position facing the support portion. An end portion of the support portion and the other member of the magnet and the coil are spaced apart from each other.

A vibration generation device according to a fourth aspect of the present disclosure includes: a base configured to transmit vibration to an object; a pendulum supported by the base swingably around a rotation axis; and a driving unit including a magnet, and a coil disposed to face the magnet in a non-contact manner, and configured to swing the pendulum. One of the magnet and the coil is provided at a position on the pendulum away from the rotation axis. The base includes a support portion supporting the pendulum swingably around the rotation axis. The pendulum extends to an outside of the support portion when viewed from a position facing the support portion. An opposite-side free end of the pendulum from the rotation axis is disposed at a position not overlapping with the base when viewed from the position facing the support portion.

A vibration reduction device according to a fifth aspect of the present disclosure includes: the vibration generation device according to the first to the fourth aspects; a detection unit configured to detect vibration of the object; and an operation control unit configured to cause the vibration generation device to generate vibration opposite in phase from the vibration detected by the detection unit.

An electronic apparatus according to a sixth aspect of the present disclosure includes: the vibration reduction device according to the fifth aspect.

DESCRIPTION OF EXEMPLARY EMBODIMENTS

First Embodiment

Hereinafter, a first embodiment according to the present disclosure will be described with reference to the drawings.

Schematic Configuration of Projector

Figure 1:
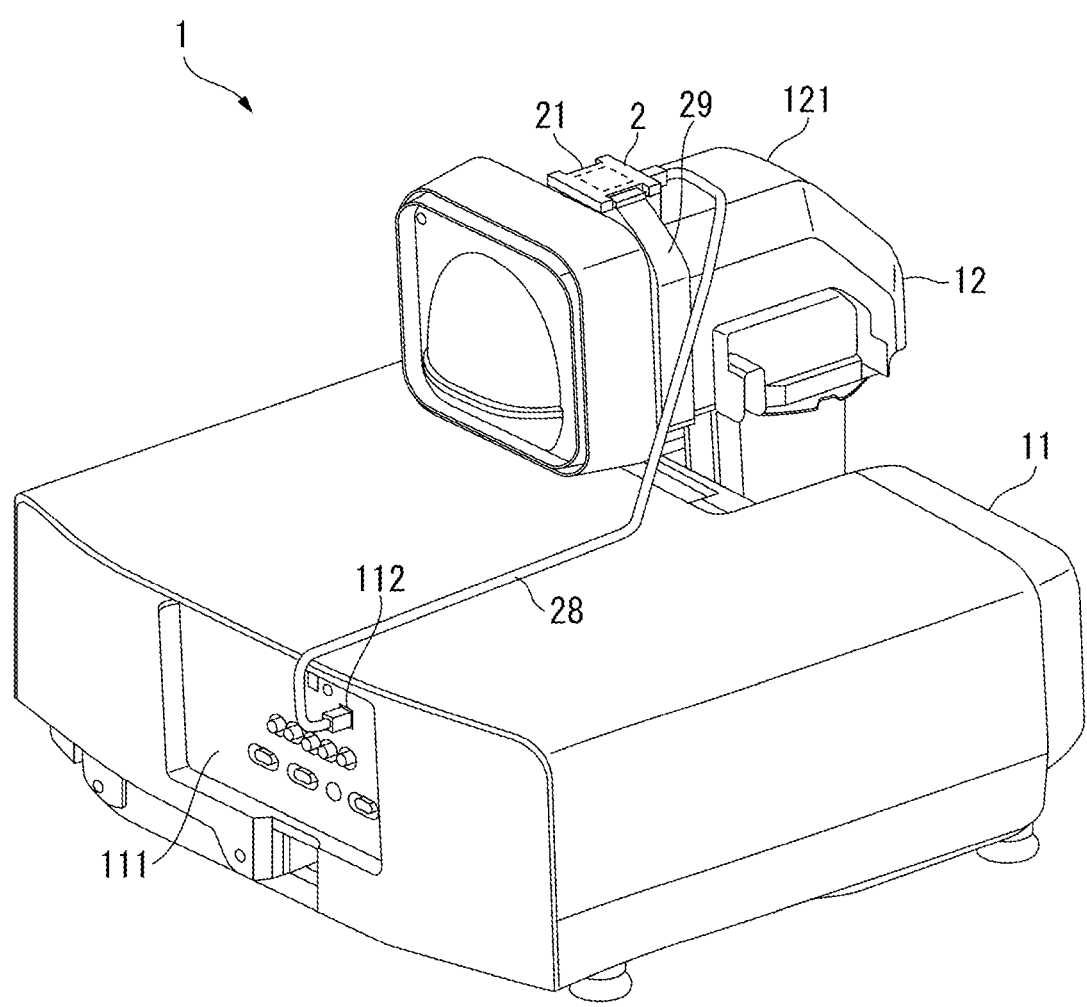
FIG. 1 is a perspective view showing a projector according to a first embodiment.

FIG. 1 is a perspective view showing a projector 1 according to the embodiment.

The projector 1 according to the embodiment is an electronic apparatus that modulates a light emitted from a light source to form an image light corresponding to image information, and enlarges and projects the formed image light onto a projection surface. As shown in FIG. 1, the projector 1 includes an exterior housing 11, a projection optical device 12, and a vibration reduction device 2. Although not shown, the projector 1 further includes the light source, a light modulation device, a power supply device, a cooling device, and a control device.

The light modulation device modulates the light emitted from the light source to form the image light corresponding to the image information.

The power supply device supplies electric power to electronic components of the projector 1.

The cooling device cools a cooling target provided inside the projector 1.

The control device controls operations of the projector 1.

Configuration of Exterior Housing

The exterior housing 11 constitutes an exterior of the projector 1, and houses the light source, the light modulation device, the power supply device, the cooling device, and the control device described above therein. The exterior housing 11 is formed in a substantially rectangular parallelepiped shape.

The exterior housing 11 includes a coupling terminal 112 to which a cable 28 of the vibration reduction device 2 to be described later is coupled in a surface 111 in a projection direction of an image projected by the projection optical device 12. The coupling terminal 112 is, for example, a universal serial bus (USB) terminal, and is used to supply the electric power to the vibration reduction device 2.

Configuration of Projection Optical Device

The projection optical device 12 projects the image light formed by the light modulation device described above onto the projection surface. In the embodiment, the projection optical device 12 is detachably attached to the exterior housing 11. That is, the projection optical device 12 is replaceable.

The projection optical device 12 shown in FIG. 1 sequentially bends a traveling direction of the image light incident on the projection optical device 12 in two stages, and projects the image light in a direction opposite from an incident direction of the image light in the projection optical device 12. That is, the projection optical device 12 has a substantially U-shape rotated by 90° counterclockwise when viewed from a direction orthogonal to a direction coupling the surface 111 in the projection direction and a surface on a side opposite from the surface 111 in the projection direction.

The projection optical device 12 includes a lens barrel 121, and further includes a plurality of lenses and a plurality of reflection members (not shown) provided in the lens barrel 121.

Configuration of Vibration Reduction Device

The vibration reduction device 2 is attached to a vibration reduction target, and reduces vibration of the vibration reduction target by generating vibration opposite in phase from the vibration acting on the vibration reduction target. In the embodiment, the vibration reduction device 2 is provided at the lens barrel 121 and reduces vibration acting on the lens barrel 121.

Here, when the vibration is propagated to the projector 1 from an outside, or when the vibration is generated due to an internal factor such as a fan of the projector 1, the projection optical device 12 provided to protrude to an outside of the exterior housing 11 is more likely to greatly vibrate than the exterior housing 11. In this way, when the projection optical device 12 vibrates, the image projected onto the projection surface by the projection optical device 12 shakes greatly.

From such a problem, in the embodiment, by providing the vibration reduction device 2 at the projection optical device 12, the vibration of the projection optical device 12 is reduced, and therefore the shaking of the image is restricted.

Hereinafter, a configuration of the vibration reduction device 2 will be described in detail.

The vibration reduction device 2 includes a device main body 21, the cable 28, and a fixture 29.

The cable 28 extends from the device main body 21. The cable 28 is coupled to the coupling terminal 112, and supplies the electric power supplied from the coupling terminal 112 to the device main body 21.

The fixture 29 fixes the device main body 21 to the vibration reduction target. In the embodiment, the fixture 29 is implemented by a belt, and is wound around an outer peripheral surface of the lens barrel 121 provided in the projection optical device 12 which is the vibration reduction target. However, the fixture 29 is not limited thereto, and may be a fastening member such as a screw as long as the fixture 29 can fix a housing 22 to the vibration reduction target.

Figure 2:
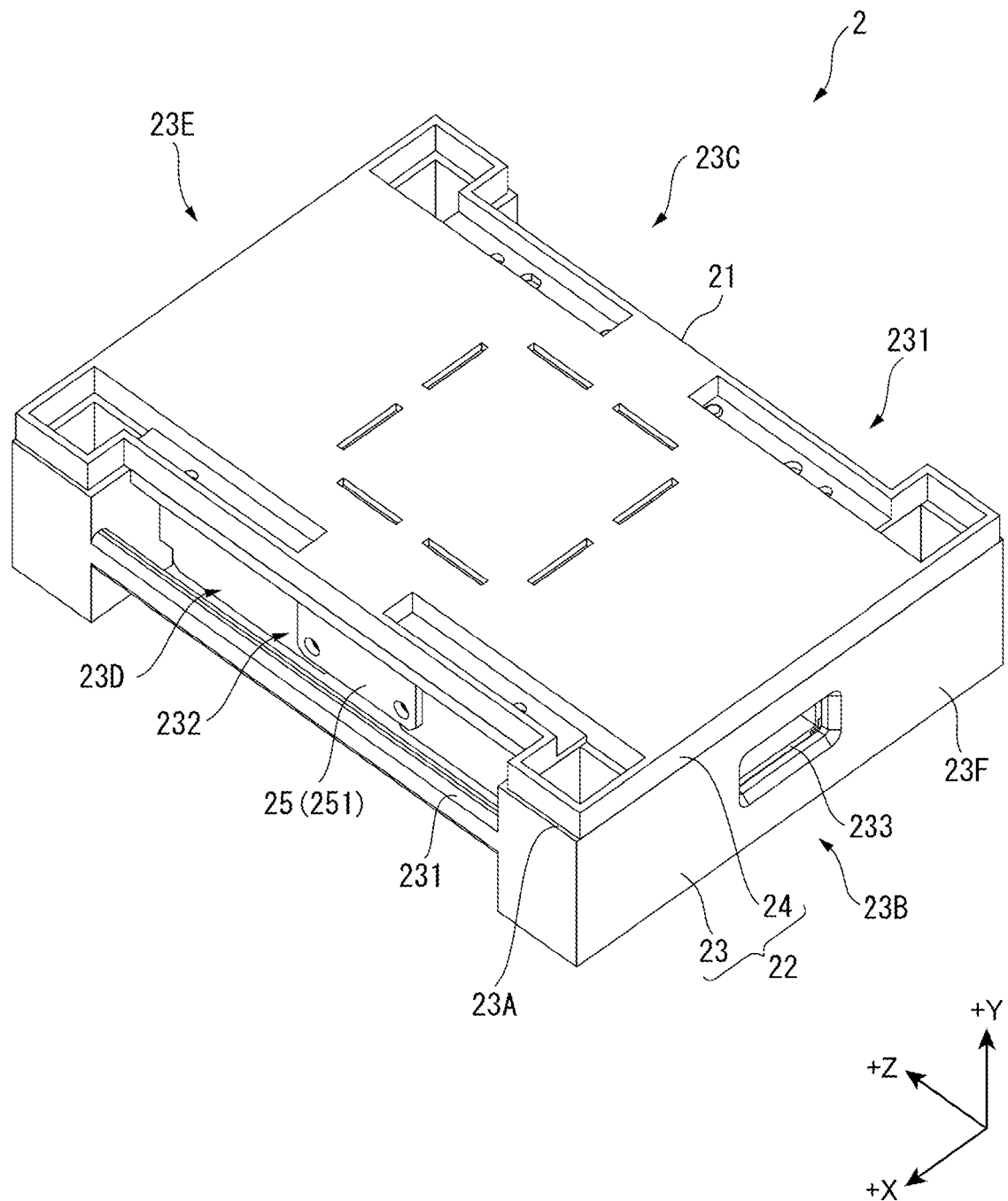
FIG. 2 is a perspective view showing a device main body of a vibration reduction device according to the first embodiment.
Figure 3:
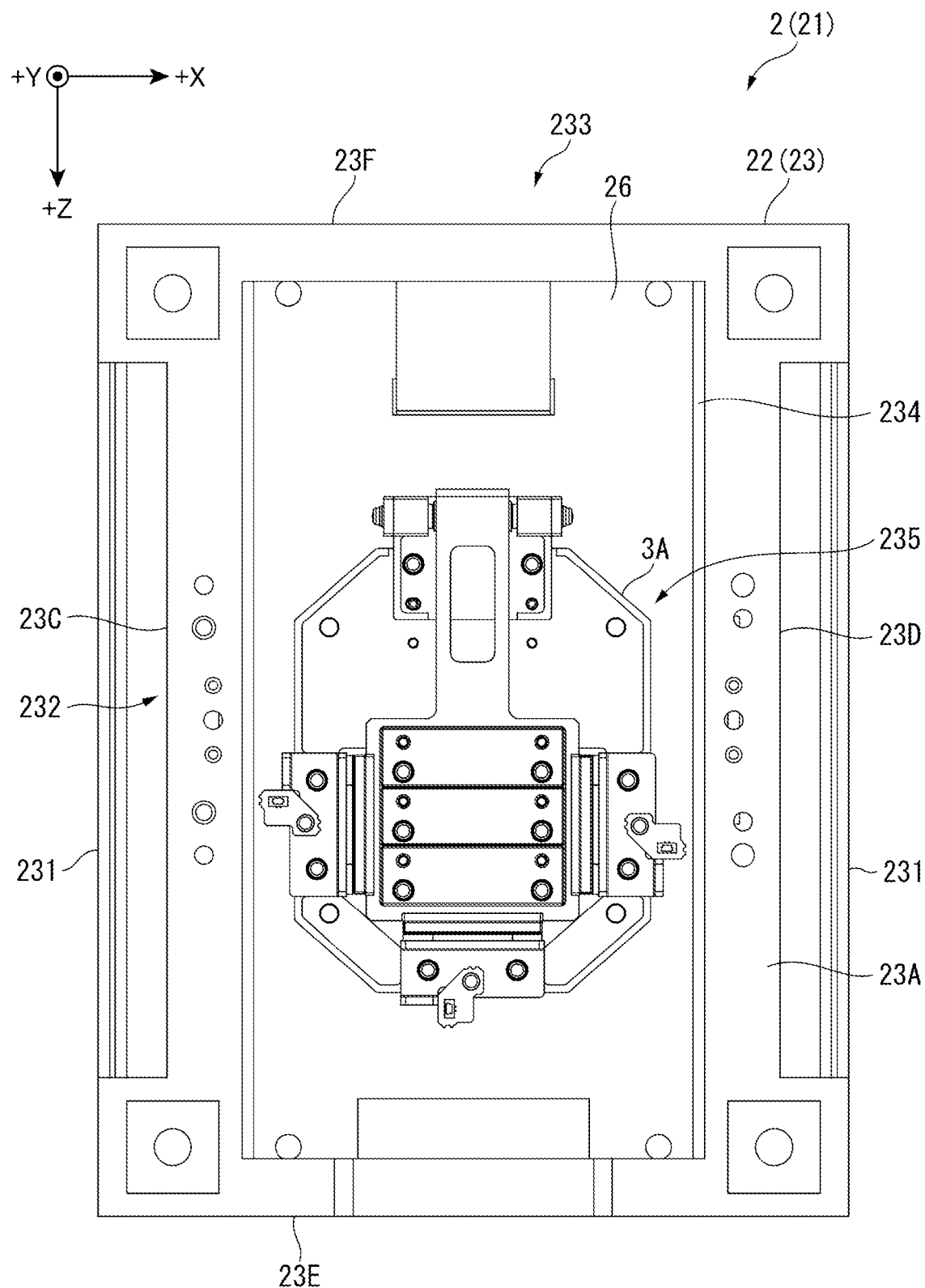
FIG. 3 is a plan view showing the device main body from which a lid member is removed according to the first embodiment.

FIG. 2 is a perspective view showing the device main body 21, and FIG. 3 is a plan view showing the device main body 21 in a state where a lid member 24 is removed.

The device main body 21 generates vibration opposite in phase from the vibration of the lens barrel 121 to reduce the vibration of the lens barrel 121. The device main body 21 includes the housing 22 and a detection unit 25 as shown in FIG. 2, and further includes an operation control unit 26 and a vibration generation device 3A as shown in FIG. 3.

The housing 22 houses the detection unit 25, the operation control unit 26, and the vibration generation device 3A. As shown in FIG. 2, the housing 22 includes a frame 23 and the lid member 24, and is formed in a substantially rectangular parallelepiped shape by combining the frame 23 and the lid member 24.

The lid member 24 is formed in a rectangular plate shape, and is detachably attached to a first surface 23A of the frame 23.

As shown in FIGS. 2 and 3, the frame 23 is formed in a rectangular frame shape having the first surface 23A, a second surface 23B, a third surface 23C, a fourth surface 23D, a fifth surface 23E, and a sixth surface 23F. The first surface 23A and the second surface 23B are opposite-side surfaces. The third surface 23C and the fourth surface 23D are opposite-side surfaces, and the fifth surface 23E and the sixth surface 23F are opposite-side surfaces.

As shown in FIG. 2, the frame 23 includes fixture attachment portions 231, a sensor attachment portion 232, and a terminal portion 233.

As shown in FIG. 2, the fixture attachment portions 231 are rod-shaped portions provided in a portion of the frame 23 on the third surface 23C side and a portion of the frame 23 on the fourth surface 23D side. End portions of the fixture 29 are attached to the fixture attachment portions 231.

The sensor attachment portion 232 is disposed at the third surface 23C. The detection unit 25 is attached to the sensor attachment portion 232.

The terminal portion 233 is provided substantially at a center of the sixth surface 23F. The cable 28 is coupled to the terminal portion 233, and the electric power is supplied from the coupling terminal 112 via the cable 28.

The detection portion 25 detects the vibration acting on the vibration reduction device 2. That is, the detection unit 25 detects the vibration acting on the lens barrel 121 of the projection optical device 12 which is the vibration reduction target. The detection unit 25 includes a printed circuit board 251 and a sensor (not shown) provided at the printed circuit board 251. The printed circuit board 251 is attached to the sensor attachment portion 232, and outputs a vibration direction and an amplitude detected by the sensor to the operation control unit 26. Examples of the sensor provided in the detection unit 25 include an acceleration sensor and a gyro sensor.

As shown in FIG. 3, the frame 23 further includes a disposition portion 234 and an attachment portion 235.

The disposition portion 234 and the attachment portion 235 are covered with the lid member 24 attached to the first surface 23A. In other words, the disposition portion 234 and the attachment portion 235 are exposed when the lid member 24 is removed from the frame 23.

The operation control unit 26 is disposed in the disposition portion 234.

The vibration generation device 3A is attached to the attachment portion 235.

The operation control unit 26 is a printed circuit board at which a plurality of circuit elements are mounted, and is disposed in the disposition portion 234. The operation control unit 26 controls operations of the vibration reduction device 2. Specifically, the operation control unit 26 operates the vibration generation device 3A based on a detection result obtained by the detection unit 25. Specifically, the operation control unit 26 supplies driving power to the vibration generation device 3A, and operates the vibration generation device 3A to generate the vibration opposite in phase from the vibration detected by the detection unit 25.

Configuration of Vibration Generation Device

Figure 4:
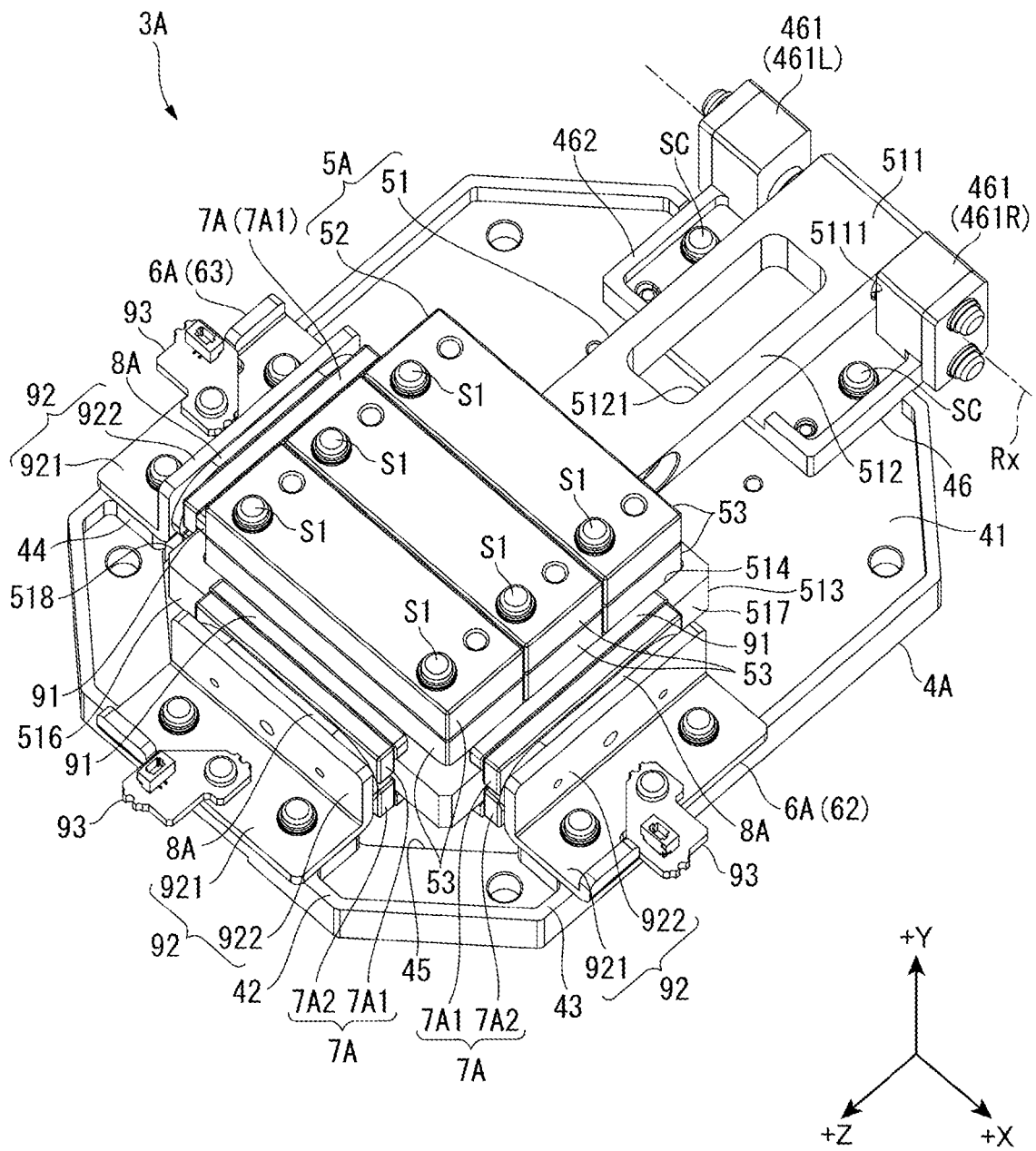
FIG. 4 is a perspective view showing a vibration generation device according to the first embodiment.
Figure 5:
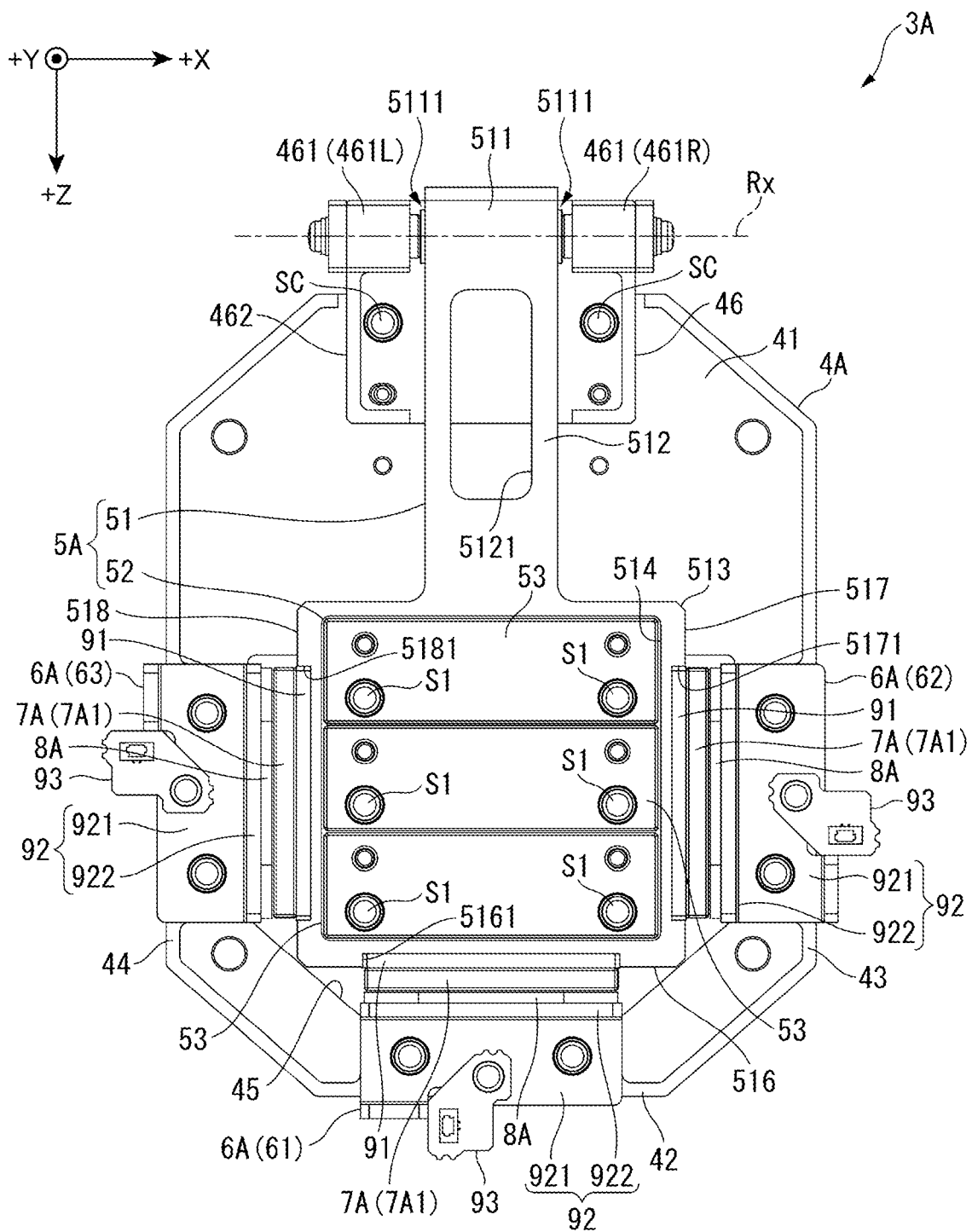
FIG. 5 is a plan view showing the vibration generation device according to the first embodiment.

FIG. 4 is a perspective view showing the vibration generation device 3A, and FIG. 5 is a plan view showing the vibration generation device 3A.

The vibration generation device 3A is attached to the attachment portion 235 provided in the frame 23. The vibration generation device 3A generates the vibration for reducing the vibration of the lens barrel 121, which is a vibration reduction object, under the control of the operation control unit 26. As shown in FIGS. 4 and 5, the vibration generation device 3A includes a base 4A, a pendulum 5A, and at least one driving unit 6A.

In the following description, three directions orthogonal to one another are defined as a +X direction, a +Y direction, and a +Z direction. The +X direction is a direction along a rotation axis Rx of the pendulum 5A, and is a direction from the third surface 23C toward the fourth surface 23D described above. The +Y direction is a direction perpendicular to the base 4A, and is a direction from the second surface 23B toward the first surface 23A described above. The +Z direction is a direction in which the pendulum 5A extends from the rotation axis Rx when viewed from the +Y direction, and is a direction from the sixth surface 23F toward the fifth surface 23E described above. Further, although not shown, a direction opposite from the +X direction is defined as a −X direction, a direction opposite from the +Y direction is defined as the −Y direction, and a direction opposite from the +Z direction is defined as a −Z direction.

Configuration of Base

The base 4A is a plate-shaped member formed in a flat plate shape. The base 4A transmits the vibration generated by the vibration generation device 3A to an object in which the base 4A is provided, that is, the frame 23. The base 4A supports the pendulum 5A and the driving unit 6A, and is attached to the attachment portion 235 shown in FIG. 3. The base 4A includes a support portion 41, fixing portions 42 to 44, a relief portion 45, and an attachment portion 46, and further includes a to-be-described buffer portion 47 shown in FIGS. 12 to 14. The buffer portion 47 will be described in detail later.

The support portion 41 is a portion of the base 4A that supports the pendulum 5A. The support portion 41 is disposed at an end portion of the base 4A in the −Z direction, and the support portion 41 is provided with the buffer portion 47 in addition to the attachment portion 46.

Figure 6:
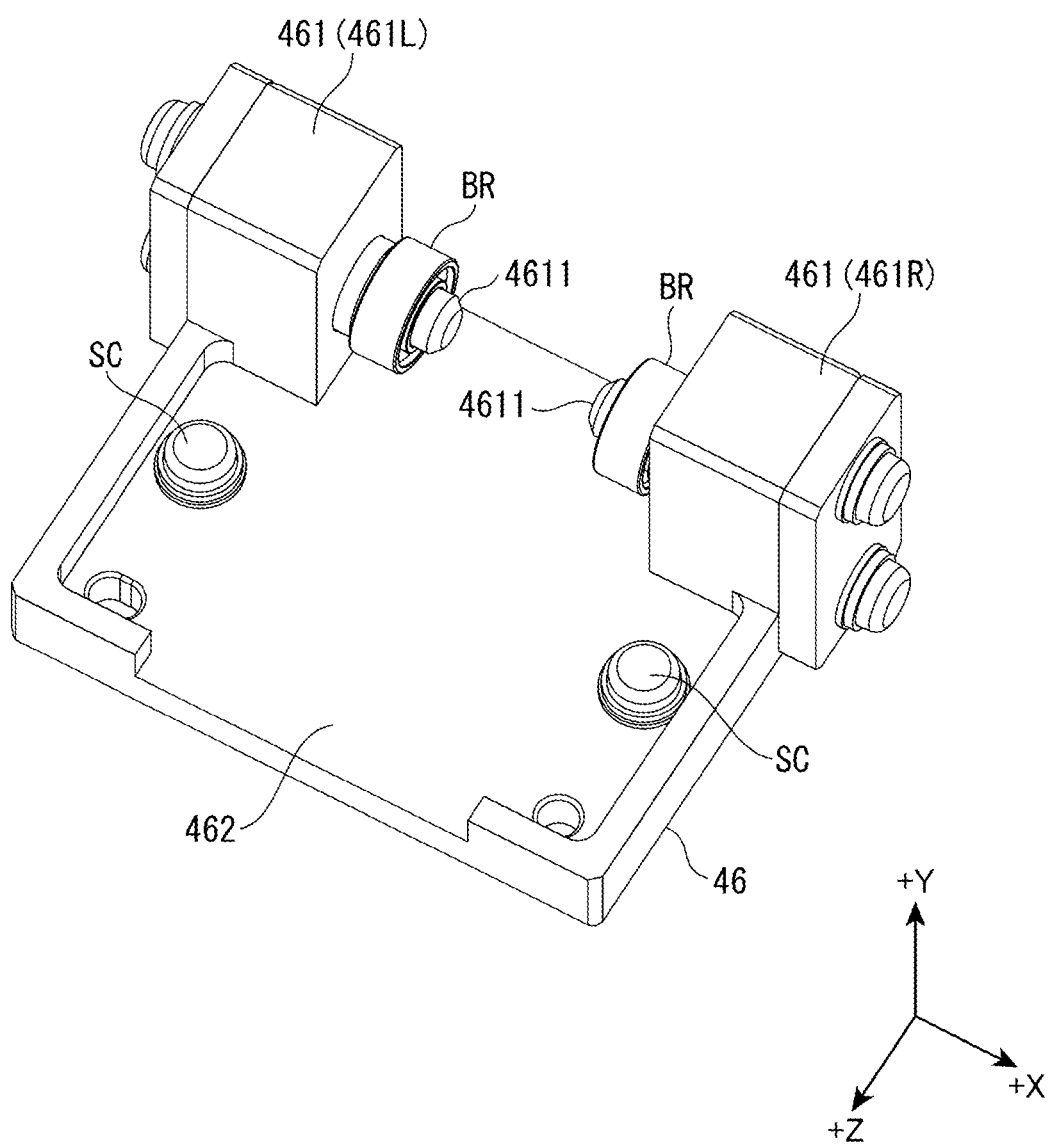
FIG. 6 is a perspective view showing an attachment portion according to the first embodiment.

FIG. 6 is a perspective view showing the attachment portion 46.

First, the attachment portion 46 will be described.

The attachment portion 46 is a portion that rotatably supports an end portion of an arm 51 of the pendulum 5A in the −Z direction, and is detachably attached to the support portion 41 of the base 4A. That is, the attachment portion 46 is a part of the support portion 41. The attachment portion 46 includes a pair of rotation axis portions 461 and a mounting portion 462.

The pair of rotation axis portions 461 are provided at positions sandwiching the arm 51 in the +X direction, and support the arm 51 rotatably around the rotation axis Rx. As shown in FIG. 6, each of the pair of rotation axis portions 461 includes a pin 4611 that forms the rotation axis Rx of the pendulum 5A. Of the pair of rotation axis portions 461, the pin 4611 in a rotation axis portion 461L disposed in the −X direction protrudes from the rotation axis portion 461L in the +X direction, and the pin 4611 in a rotation axis portion 461R disposed in the +X direction protrudes from the rotation axis portion 461R in the −X direction. The pins 4611 are inserted into the arm 51. Accordingly, the arm 51 is supported swingably around the rotation axis Rx along the +X direction. The pair of rotation axis portions 461 are provided at an end portion of the mounting portion 462 in the −Z direction.

The mounting portion 462 is detachably attached to the support portion 41 by screws SC. Therefore, the arm 51, hence the pendulum 5A can be detached from the base 4A by detaching the mounting portion 462 from the support portion 41.

As shown in FIGS. 4 and 5, each of the fixing portions 42 to 44 is a portion of the base 4A to which a holding member 92 of the driving unit 6A can be fixed. The fixing portion 42 is provided at an end portion of the base 4A in the +Z direction. The fixing portion 43 is provided at an end portion of the base 4A in the +X direction, and the fixing portion 44 is provided at an end portion of the base 4A in the −X direction.

That is, the fixing portion 43 is a portion extending in the +Z direction, which is an extending direction of the pendulum 5A from the rotation axis Rx, from an end portion of the support portion 41 in the +X direction along the rotation axis Rx. The fixing portion 44 is a portion extending in the +Z direction, which is the extending direction of the pendulum 5A from the rotation axis Rx, from an end portion of the support portion 41 in the −X direction along the rotation axis Rx. The fixing portion 42 is a portion for coupling opposite-side end portions of the fixing portions 43 and 44 from the support portion 41.

The relief portion 45 is provided between the support portion 41 and the fixing portion 42 in the +Z direction. Specifically, the relief portion 45 is provided in a portion surrounded by the support portion 41 and the fixing portions 42 to 44. The relief portion 45 is provided according to at least a first side surface portion 516 that is an opposite-side free end of the pendulum 5A from the rotation axis Rx, and is an avoidance portion that avoids contact with the first side surface portion 516 when the pendulum 5A swings around the rotation axis Rx. In other words, the relief portion 45 is a portion that retreats from the first side surface portion 516 that moves in the ±Y directions when the pendulum 5A swings around the rotation axis Rx. In the embodiment, the relief portion 45 is an opening penetrating the base 4A along the +Y direction.

The positional correlation between the relief portion 45 and the pendulum 5A will be described in detail later.

Configuration of Pendulum

Figure 7:
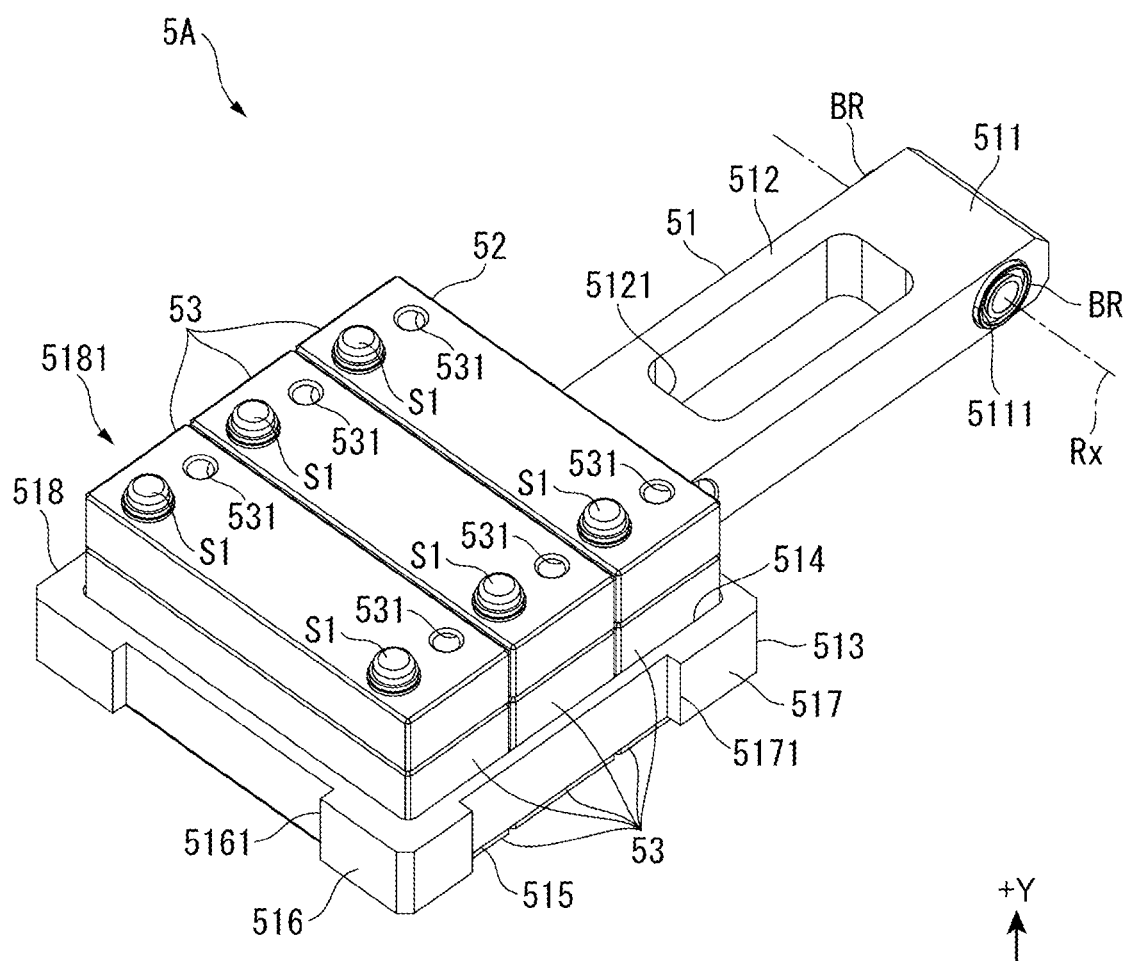
FIG. 7 is a perspective view showing a pendulum according to the first embodiment.
Figure 8:
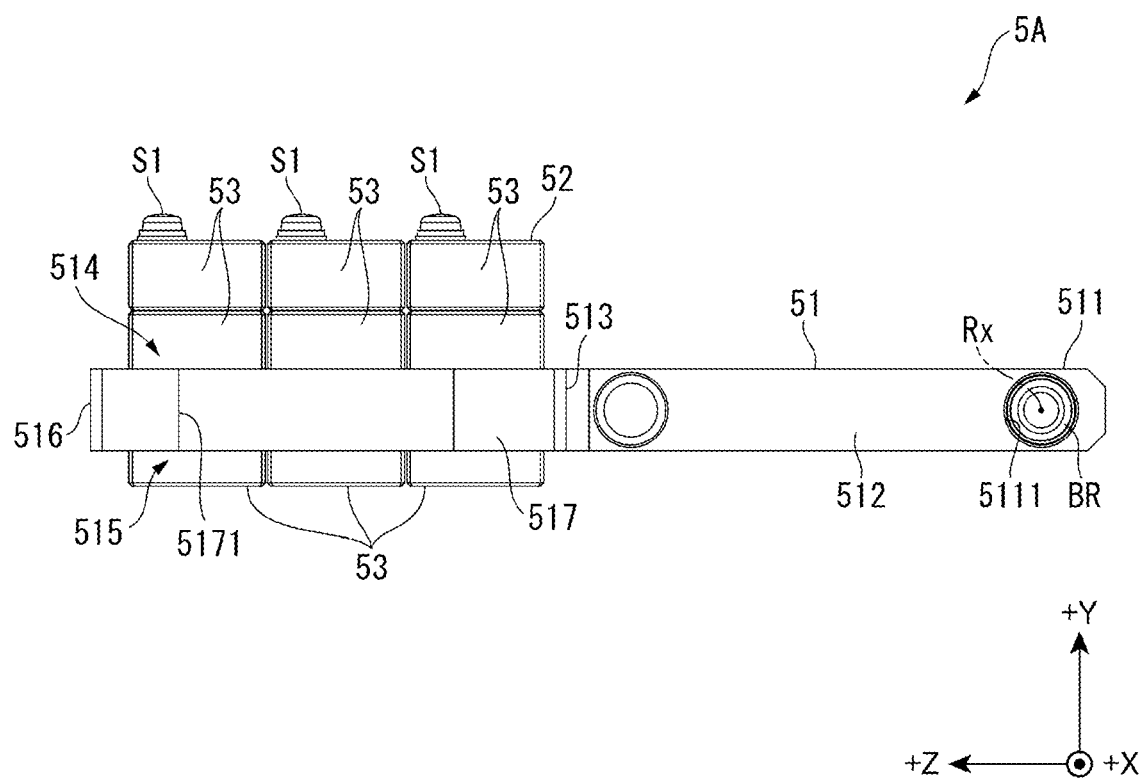
FIG. 8 is a side view showing an arm according to the first embodiment.

FIG. 7 is a perspective view showing the pendulum 5A. FIG. 8 is a side view of the arm 51 as viewed from the +X direction.

The pendulum 5A is supported by the base 4A swingably around the rotation axis Rx, and extends in the +Z direction from the rotation axis Rx. The pendulum 5A is swung around the rotation axis Rx by the driving unit 6A, and thus generates vibration. As shown in FIGS. 4, 5, 7, and 8, the pendulum 5A includes a arm 51 and a weight portion 52.

Configuration of Arm

The arm 51 is supported rotatably around the rotation axis Rx by the pair of rotation axis portions 461 of the attachment portion 46 attached to the support portion 41.

As shown in FIG. 7, when viewed from the +Y direction, the arm 51 has a substantially T-shape in which an end portion of the arm 51 in the +Z direction is larger than an end portion of the arm 51 in the −Z direction. As shown in FIGS. 7 and 8, the arm 51 includes a coupling portion 511, an extending portion 512, an enlarged portion 513, disposition portions 514 and 515, the first side surface portion 516, a second side surface portion 517, and a third side surface portion 518. The first side surface portion 516 is a tip end portion of the enlarged portion 513, and the second side surface portion 517 and the third side surface portion 518 are side surface portions of the enlarged portion 513 in the +X direction and the −X direction.

The coupling portion 511 is a portion of the arm 51 supported by the pair of rotation axis portions 461. In the embodiment, the coupling portion 511 is provided at an end portion of the arm 51 in the −Z direction. The coupling portion 511 is provided with a hole portion 5111 in each of a surface of the coupling portion 511 facing the +X direction and a surface of the coupling portion 511 facing the −X direction. A bearing BR shown in FIG. 7 is disposed inside each hole portion 5111. The pin 4611 of each rotation axis portion 461 is inserted into the bearing BR via a washer (not shown), and thus the arm 51, hence the pendulum 5A is supported by the support portion 41 of the base 4A.

In this way, when the coupling portion 511 is supported by the rotation axis portions 461, the pendulum 5A extends in the +Z direction toward an outside from the support portion 41.

The extending portion 512 is an extending portion from the coupling portion 511 to the enlarged portion 513. A dimension of the extending portion 512 along the +X direction is smaller than a dimension of the enlarged portion 513 along the +X direction, and a dimension of the extending portion 512 along the +X direction is constant in a range from the coupling portion 511 to the enlarged portion 513.

The extending portion 512 is provided with a through hole 5121 to reduce a weight of the arm 51 and to locate a position of a center of gravity of the arm 51 further toward the +Z direction. However, the through hole 5121 is not limited thereto. A recess may be provided instead of the through hole 5121, or the through hole 5121 may not be provided.

The enlarged portion 513 is a portion of the arm 51 in the +Z direction. The dimension of the enlarged portion 513 along the +X direction is larger than a dimension of the coupling portion 511 along the +X direction. The center of gravity of the arm 51 including the enlarged portion 513 is located closer to the +Z direction than is an intermediate position between the rotation axis Rx and an end portion of the arm 51 in the +Z direction. That is, regardless of a configuration and disposition of the weight portion 52, the center of gravity of the arm 51 is located closer to the first side surface portion 516 side than is an intermediate position between the rotation axis Rx and the end portion of the arm 51 on the first side surface portion 516 side.

The disposition portion 514 is provided at a surface of the enlarged portion 513 in the +Y direction. Specifically, the disposition portion 514 is a recess recessed in the −Y direction from the surface of the enlarged portion 513 in the +Y direction, and is formed in a substantially square shape when viewed from the +Y direction.

The disposition portion 515 is provided at a surface of the enlarged portion 513 in the −Y direction. Specifically, the disposition portion 515 is a recess recessed in the +Y direction from the surface of the enlarged portion 513 in the −Y direction, and is formed in a substantially square shape when viewed from the −Y direction.

The weight portion 52 is disposed at at least one of the disposition portions 514 and 515. That is, the disposition portions 514 and 515 are provided at positions away from the rotation axis Rx to the first side surface portion 516 side, and are portions where the weight portions 52 can be disposed.

The weight portion 52 includes at least one weight portion member 53. That is, a weight and a position of a center of gravity of the weight portion 52 are adjusted according to the number and disposition of the weight portion members 53 constituting the weight portion 52.

The weight portion member 53 is disposed along the rotation axis Rx at one of the disposition portions 514 and 515. The weight portion member 53 has through holes 531 penetrating the weight portion member 53 along the +Y direction. The weight portion member 53 is fixed to one of the disposition portions 514 and 515 by screws S1 inserted through the through holes 531.

Three weight portion members 53 can be disposed along the +Z direction orthogonal to the rotation axis Rx when viewed from a position facing the disposition portion 514, and the weight portion member 53 can be further disposed in the +Y direction with respect to the weight portion member 53 disposed at the disposition portion 514. That is, the weight portion member 53 can be disposed at the disposition portions 514 and 515 in a stacked way. Specifically, the weight portion member 53 is formed in a substantially rectangular parallelepiped shape having a longitudinal axis along the +X direction. When a plurality of weight portion members 53 are disposed to overlap with one another at the disposition portion 514 in the +Y direction, the screws S1 are fixed to the disposition portion 514 in a state of being inserted through the through holes 531 of each weight portion member 53. The same applies to the disposition portion 515. With such a configuration, the number and disposition of the weight portion members 53 provided at the arm 51 can be adjusted, and the weight and the position of the center of gravity of the arm 51 provided with the weight portion 52 can be adjusted.

Particularly, the weight portion member 53 disposed at the disposition portion 515 is disposed at a position not overlapping with the base 4A when viewed from the +Y direction from the support portion 41 toward the pendulum 5A.

As shown in FIGS. 7 to 8, the first side surface portion 516 is an end portion on an opposite side of a center of the arm 51 from the rotation axis Rx in the +Z direction, which is the extending direction of the arm 51, among directions intersecting with the rotation axis Rx. That is, the first side surface portion 516 is a tip end portion of the arm 51 facing the +Z direction, and is a free end when the arm 51 swings. The first side surface portion 516 includes an attachment portion 5161 recessed in the −Z direction. A plate member 91 constituting a first driving unit 61 is attached to the attachment portion 5161. As will be described in detail later, the first side surface portion 516 is disposed at a position not overlapping with the base 4A when viewed from the +Y direction from the support portion 41 toward the pendulum 5A.

The second side surface portion 517 and the third side surface portion 518 intersect with the +X direction, which is a direction parallel to the rotation axis Rx, and are opposite-side end portions. Specifically, the second side surface portion 517 is the side surface portion of the enlarged portion 513 facing the +X direction, and the third side surface portion 518 is the side surface portion of the enlarged portion 513 facing the −X direction.

The second side surface portion 517 includes an attachment portion 5171 recessed in the −X direction. The plate member 91 of a second driving unit 62 is attached to the attachment portion 5171.

The third side surface portion 518 includes an attachment portion 5181 recessed in the +X direction. The plate member 91 of a third driving unit 63 is attached to the attachment portion 5181.

The second side surface portion 517 and the third side surface portion 518 may be disposed at positions not overlapping with the base 4A when viewed from the +Y direction from the support portion 41 toward the pendulum 5A.

Configuration of Driving Unit

Figure 9:
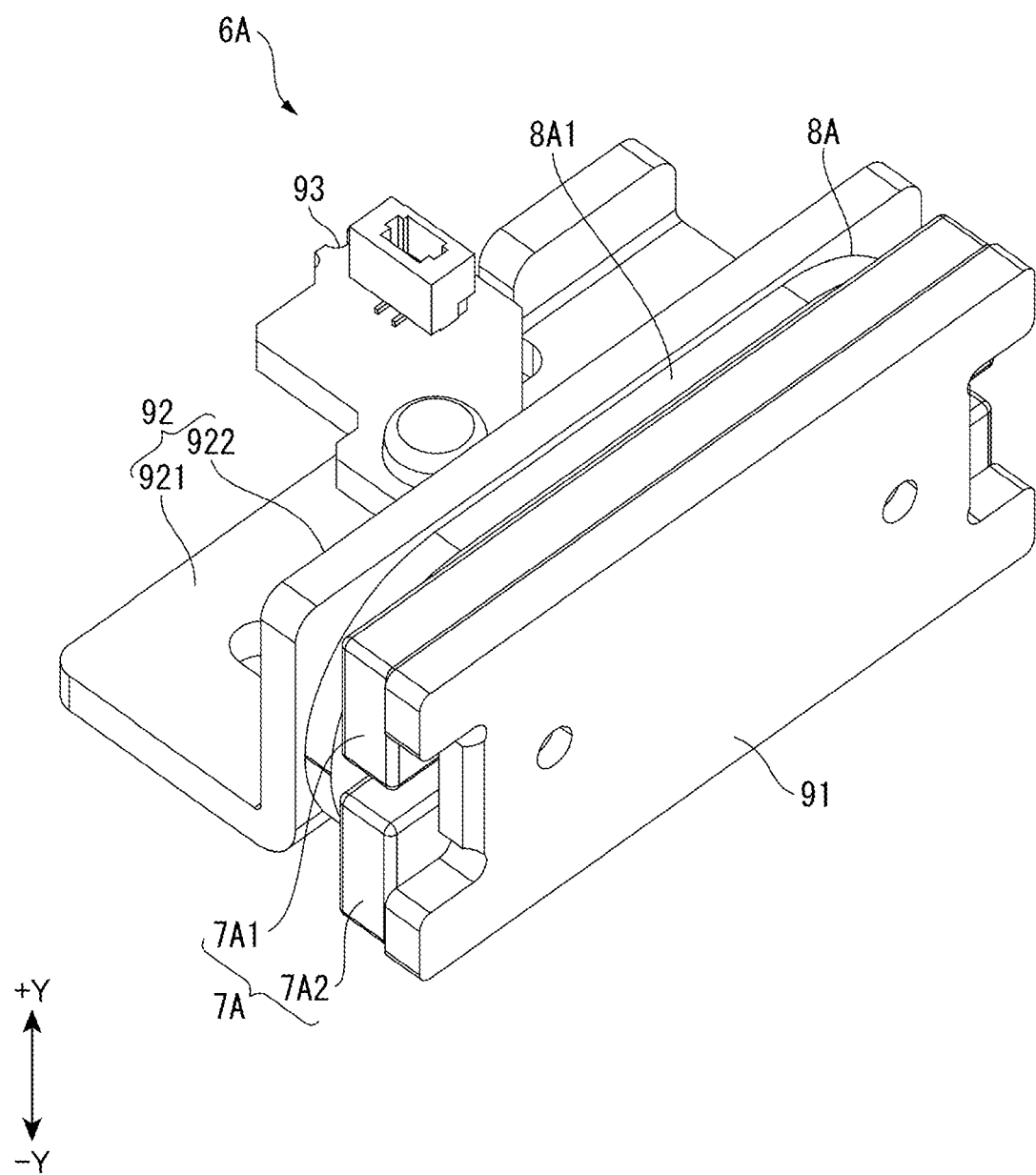
FIG. 9 is a perspective view showing a driving unit according to the first embodiment.
Figure 10:
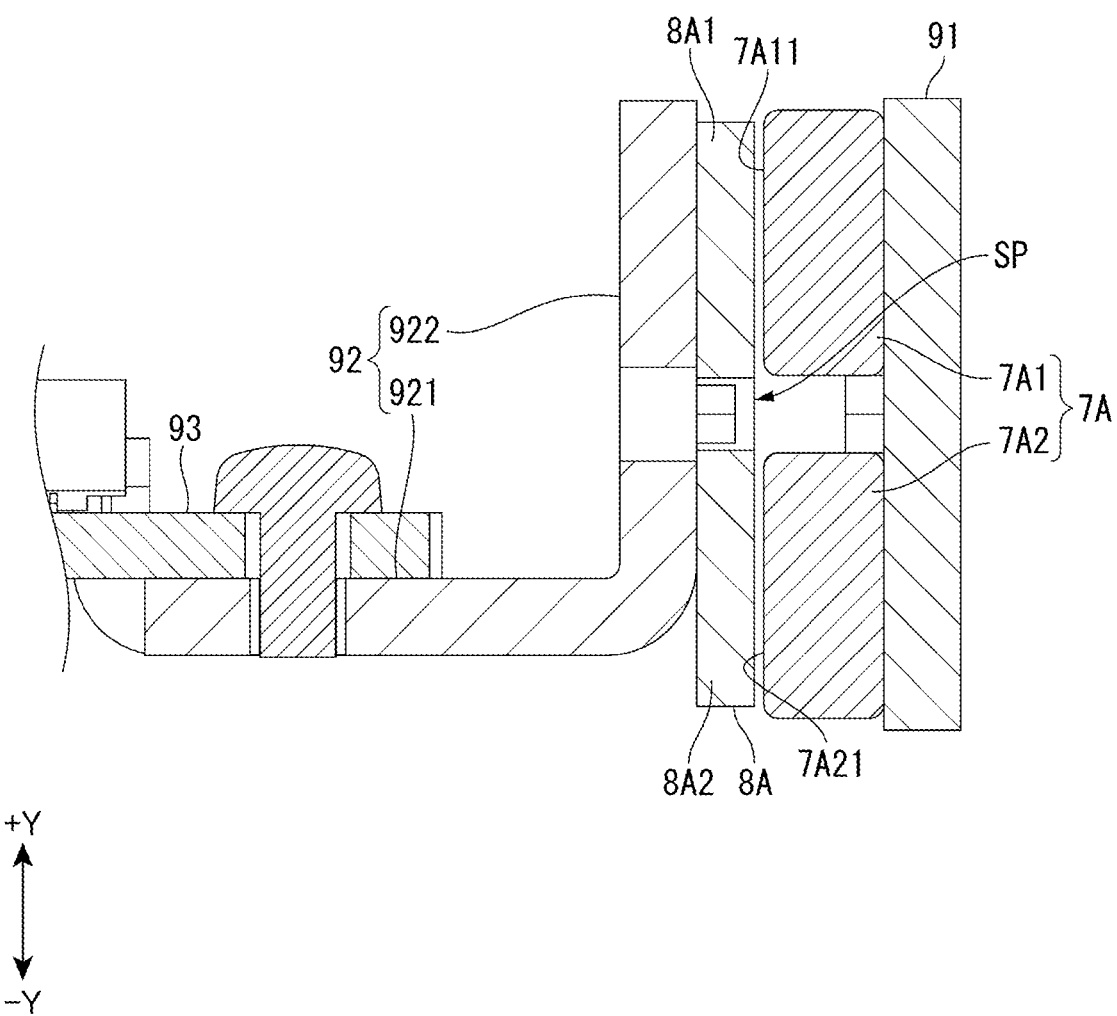
FIG. 10 is a cross-sectional view showing the driving unit according to the first embodiment.

FIG. 9 is a perspective view showing the driving unit 6A, and FIG. 10 is a cross-sectional view showing the driving unit 6A.

The driving unit 6A swings the pendulum 5A supported by the base 4A around the rotation axis Rx. At least one driving unit 6A is provided in the vibration generation device 3A. In other words, the vibration generation device 3A includes at least one driving unit 6A.

As shown in FIGS. 9 and 10, the driving unit 6A includes a magnet 7A, a coil 8A, the plate member 91, the holding member 92, and a terminal portion 93. The driving unit 6A further includes a control unit (not shown).

Configuration of Magnet

The magnet 7A is provided at a position separated from the rotation axis Rx at the pendulum 5A by the plate member 91. The magnet 7A is attracted or repelled with respect to a magnetic force generated in the coil 8A, thereby swinging the pendulum 5A around the rotation axis Rx. The magnet 7A includes a first magnet member 7A1 and a second magnet member 7A2.

Each of the first magnet member 7A1 and the second magnet member 7A2 is formed in a substantially rectangular parallelepiped shape having a longitudinal axis. A dimension of the first magnet member 7A1 along the longitudinal axis and a dimension of the second magnet member 7A2 along the longitudinal axis substantially coincide with a dimension of the coil 8A along the same direction.

As shown in FIG. 10, a surface 7A11 of the first magnet member 7A1 facing the coil 8A faces a first extending portion 8A1 of the coil 8A, which will be described later. A magnetic pole of the surface 7A11 is an S pole in the embodiment.

The second magnet member 7A2 is disposed to be separated from the first magnet member 7A1 in the −Y direction. Specifically, the second magnet member 7A2 is separated from the first magnet member 7A1 in the −Y direction from the first extending portion 8A1 toward a to-be-described second extending portion 8A2 of the coil 8A. As shown in FIG. 10, a surface 7A21 of the second magnet member 7A2 facing the coil 8A faces the second extending portion 8A2 of the coil 8A. A magnetic pole of the surface 7A21 is an N pole in the embodiment. That is, the magnetic pole of the surface 7A11 of the first magnet member 7A1 facing the first extending portion 8A1 is different from the magnetic pole of the surface 7A21 of the second magnet member 7A2 facing the second extending portion 8A2.

Configuration of Plate Member

The plate member 91 is formed in a flat plate shape. The plate member 91 supports the magnet 7A and is attached to the arm 51 of the pendulum 5A. Accordingly, the magnet 7A is attached to the pendulum 5A. The plate member 91 functions as a yoke for the magnet 7A. That is, the plate member 91 is a magnet-side yoke provided at an opposite-side position of the magnet 7A from the coil 8A.

Configuration of Coil

Figure 11:
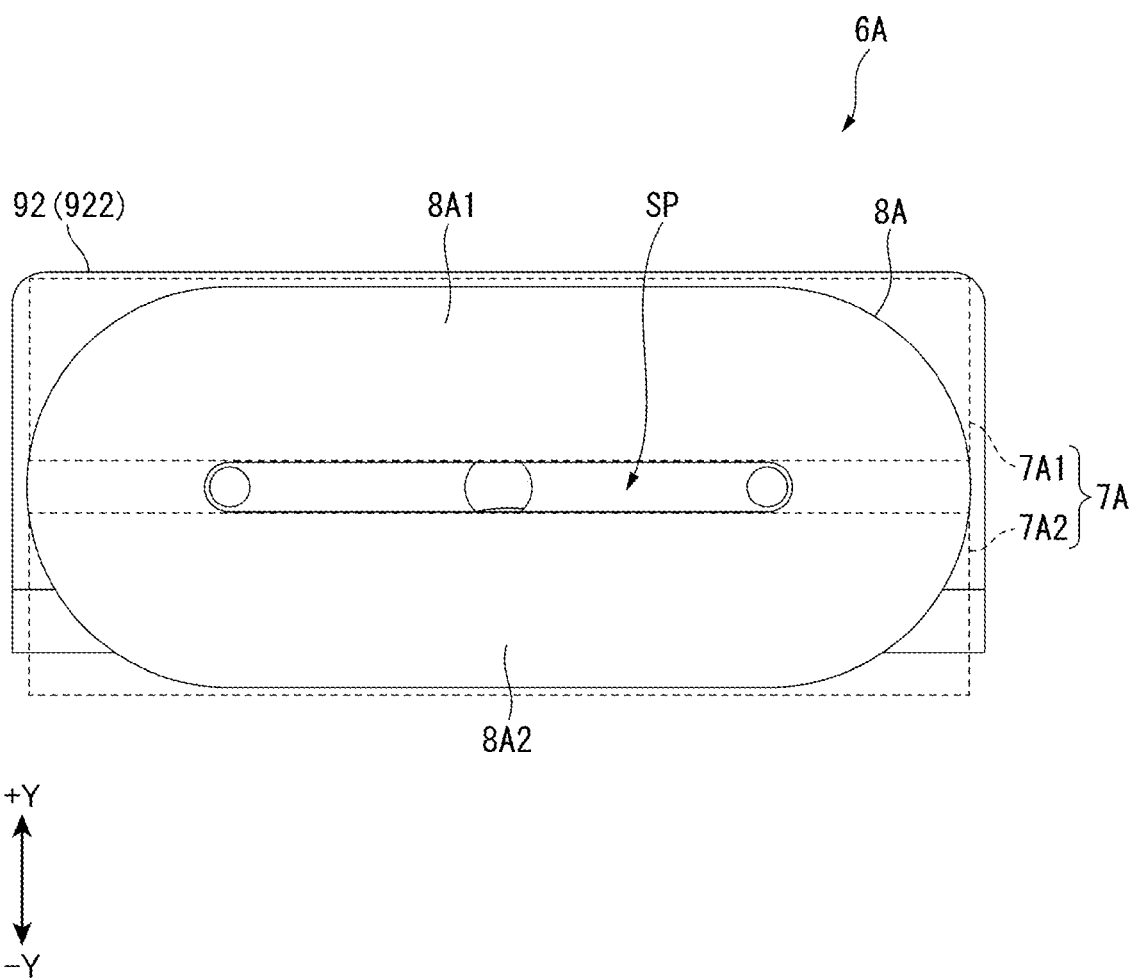
FIG. 11 is a view showing a coil according to the first embodiment.

FIG. 11 is a view showing the coil 8A constituting the driving unit 6A.

The coil 8A is provided at a configuration other than the pendulum 5A. In the embodiment, the coil 8A is fixed to the base 4A by the holding member 92. The coil 8A is disposed to face the magnet 7A in a non-contact manner, and generates a magnetic field acting on the magnet 7A.

As shown in FIG. 11, the coil 8A is an air-core coil formed in a track shape or an oval shape having a longitudinal axis by winding a conductive wire in a planar manner when viewed from the magnet 7A. Therefore, when viewed from the magnet 7A, a dimension of the coil 8A along the longitudinal axis is larger than a dimension of the coil 8A along a transverse axis orthogonal to the longitudinal axis.

The coil 8A includes the first extending portion 8A1 and the second extending portion 8A2.

The first extending portion 8A1 is a portion linearly extending along the longitudinal axis of the coil 8A. The first extending portion 8A1 is disposed in the +Y direction with respect to an air-core portion SP of the coil 8A.

The second extending portion 8A2 is disposed on a side opposite from the first extending portion 8A1 with the air-core portion SP of the coil 8A sandwiched therebetween. That is, the second extending portion 8A2 is disposed in the −Y direction with respect to the first extending portion 8A1.

The second extending portion 8A2 linearly extends along the longitudinal axis of the coil 8A. A dimension of the second extending portion 8A2 along the longitudinal axis of the coil 8A is substantially the same as a dimension of the first extending portion 8A1 along the longitudinal axis of the coil 8A. When the control unit causes a current to flow through the coil 8A, a direction of the current in the second extending portion 8A2 is opposite from a direction of the current in the first extending portion 8A1.

In the embodiment, the coil 8A is the air-core coil having no core as described above, and may be a coil having a core between the first extending portion 8A1 and the second extending portion 8A2.

Configuration of Holding Member

The holding member 92 is fixed to one of the fixing portions 42 to 44 in a state of holding the coil 8A and the terminal portion 93. The holding member 92 includes a first plate-shaped portion 921 orthogonal to the +Y direction and a second plate-shaped portion 922 standing from the first plate-shaped portion 921 in the +Y direction. The holding member 92 is made of a ferromagnetic material, and is formed in a substantially L shape when viewed from a lateral side.

A surface of the first plate-shaped portion 921 in the −Y direction is in contact with one of the fixing portions 42 to 44. The terminal portion 93 is attached to the surface of the first plate-shaped portion 921 in the +Y direction.

The coil 8A is attached to a surface of the second plate-shaped portion 922 in a direction opposite from a direction in which the first plate-shaped portion 921 extends from the second plate-shaped portion 922. Specifically, the coil 8A is attached to a surface of the second plate-shaped portion 922 facing the magnet 7A. Since the holding member 92 is made of the ferromagnetic material, the second plate-shaped portion 922 functions as a yoke that controls a direction of the magnetic field generated by the coil 8A. That is, the vibration generation device 3A includes the holding member 92 including the second plate-shaped portion 922 which is a coil-side yoke disposed at an opposite side of the coil 8A from the magnet 7A, and the holding member 92 is a ferromagnetic holding member that holds the coil 8A.

Configuration of Terminal Portion

The terminal portion 93 is electrically coupled to the operation control unit 26 of the vibration reduction device 2, and supplies a current supplied from the operation control unit 26 to the control unit (not shown). Accordingly, the control unit causes the coil 8A to generate a magnetic force to apply a driving force to the pendulum 5A including the magnet 7A, thereby swinging the pendulum 5A. Specifically, the control unit (not shown) causes an AC current to flow through the coil 8A to alternately reverse the direction of the magnetic field generated by the coil 8A, thereby swinging the pendulum 5A. That is, the control unit (not shown) alternately switches the direction of the current flowing through the coil 8A.

When the AC current flows through the coil 8A, a magnetic field is generated from one of the first extending portion 8A1 and the second extending portion 8A2 toward the other extending portion. That is, one of the extending portions is an N pole, and the other extending portion is an S pole. The control unit causes an AC current of a predetermined frequency to flow through the coil 8A, thereby alternately switching the magnetic pole of the first extending portion 8A1 and the magnetic pole of the second extending portion 8A2.

As described above, the magnetic pole of the surface 7A11 of the first magnet member 7A1 facing the first extending portion 8A1 in a non-contact manner is different from the magnetic pole of the surface 7A21 of the second magnet member 7A2 facing the second extending portion 8A2 in a non-contact manner.

Therefore, when the AC current flows through the coil 8A, the pendulum 5A to which the magnet 7A is attached by the plate member 91 swings around the rotation axis Rx according to a frequency of the AC current. The frequency of the AC current flowing through the coil 8A is set by the operation control unit 26 according to the vibration detected by the detection unit 25 included in the vibration reduction device 2. Accordingly, the vibration generation device 3A can generate the vibration opposite in phase from the vibration propagated to the projection optical device 12, and therefore the vibration of the projection optical device 12 can be reduced.

Specific Disposition of Configurations of First Driving Unit, Second Driving Unit, and Third Driving Unit As described above, the vibration generation device 3A includes at least one driving unit 6A. In the embodiment, the vibration generation device 3A includes a plurality of driving units 6A, and the plurality of driving units 6A include the first driving unit 61, the second driving unit 62, and the third driving unit 63.

In other words, each of the first driving unit 61, the second driving unit 62, and the third driving unit 63 is one of the plurality of driving units 6A provided in the vibration generation device 3A. The first driving unit 61 is provided in the +Z direction with respect to the pendulum 5A, the second driving unit 62 is provided in the +X direction with respect to the pendulum 5A, and the third driving unit 63 is provided in the −X direction with respect to the pendulum 5A.

Specifically, the first driving unit 61 includes the magnet 7A, the coil 8A, the plate member 91, the holding member 92, and the terminal portion 93, and further includes a control unit (not shown). The magnet 7A of the first driving unit 61 corresponds to a first magnet, and the coil 8A of the first driving unit 61 corresponds to a first coil.

In the first driving unit 61, the plate member 91 is attached to the attachment portion 5161 provided at the first side surface portion 516 of the arm 51.

The first magnet member 7A1 and the second magnet member 7A2 constituting the magnet 7A are fixed to a surface of the plate member 91 in the +Z direction such that a longitudinal axis of each of the magnet members 7A1 and 7A2 is along the +X direction. That is, the magnet 7A of the first driving unit 61 is provided at the first side surface portion 516 to be separated from the rotation axis Rx.

The first plate-shaped portion 921 of the holding member 92 is fixed to the fixing portion 42 of the base 4A.

The coil 8A is attached to a surface of the second plate-shaped portion 922 of the holding member 92 facing the magnet 7A in the −Z direction to face the magnet 7A in a non-contact manner. Specifically, the coil 8A is disposed such that the first extending portion 8A1 faces the first magnet member 7A1 in the +Z direction in a non-contact manner and the second extending portion 8A2 faces the second magnet member 7A2 in the +Z direction in a non-contact manner.

As described above, a magnetic pole of a surface of the first magnet member 7A1 facing the first extending portion 8A1 is different from a magnetic pole of a surface of the second magnet member 7A2 facing the second extending portion 8A2.

The second driving unit 62 includes the magnet 7A, the coil 8A, the plate member 91, the holding member 92, and the terminal portion 93, and further includes a control unit (not shown). The magnet 7A of the second driving unit 62 corresponds to a second magnet, and the coil 8A of the second driving unit 62 corresponds to a second coil.

In the second driving unit 62, the plate member 91 is attached to the attachment portion 5171 provided at the second side surface portion 517 of the arm 51.

The first magnet member 7A1 and the second magnet member 7A2 constituting the magnet 7A are fixed to a surface of the plate member 91 in the +X direction such that a longitudinal axis of each of the magnet members 7A1 and 7A2 is along the +Z direction. That is, the magnet 7A of the second driving unit 62 is provided at the second side surface portion 517 to be separated from the rotation axis Rx.

The first plate-shaped portion 921 of the holding member 92 is fixed to the fixing portion 43 of the base 4A.

The coil 8A is attached to a surface of the second plate-shaped portion 922 of the holding member 92 facing the magnet 7A in the −X direction to face the magnet 7A in a non-contact manner. Specifically, the coil 8A is disposed such that the first extending portion 8A1 faces the first magnet member 7A1 in the +X direction in a non-contact manner and the second extending portion 8A2 faces the second magnet member 7A2 in the +X direction in a non-contact manner.

As described above, a magnetic pole of a surface of the first magnet member 7A1 facing the first extending portion 8A1 is different from a magnetic pole of a surface of the second magnet member 7A2 facing the second extending portion 8A2.

The third driving unit 63 includes the magnet 7A, the coil 8A, the plate member 91, the holding member 92, and the terminal portion 93, and further includes a control unit (not shown). The magnet 7A of the third driving unit 63 corresponds to a third magnet, and the coil 8A of the third driving unit 63 corresponds to a third coil.

In the third driving unit 63, the plate member 91 is attached to the attachment portion 5181 provided at the third side surface portion 518 of the arm 51.

The first magnet member 7A1 and the second magnet member 7A2 constituting the magnet 7A are fixed to a surface of the plate member 91 in the −X direction such that a longitudinal axis of each of the magnet members 7A1 and 7A2 is along the +Z direction. That is, the magnet 7A of the third driving unit 63 is provided at the third side surface portion 518 to be separated from the rotation axis Rx.

The first plate-shaped portion 921 of the holding member 92 is fixed to the fixing portion 44 of the base 4A.

The coil 8A is attached to a surface of the second plate-shaped portion 922 of the holding member 92 facing the magnet 7A in the +X direction to face the magnet 7A in a non-contact manner. Specifically, the coil 8A is disposed such that the first extending portion 8A1 faces the first magnet member 7A1 in the +X direction in a non-contact manner and the second extending portion 8A2 faces the second magnet member 7A2 in the +X direction in a non-contact manner.

As described above, a magnetic pole of a surface of the first magnet member 7A1 facing the first extending portion 8A1 is different from a magnetic pole of a surface of the second magnet member 7A2 facing the second extending portion 8A2.

Synchronization of Driving Units

The control units of the driving units 61 to 63 cause the coils 8A to generate the magnetic fields by causing the AC currents to flow through the corresponding coils 8A. At this time, the control units cause the AC currents of the same frequency and the same phase to flow through the coils 8A such that the first extending portions 8A1 of the coils 8A of the driving units 61 to 63 have the same magnetic pole and the second extending portions 8A2 of the coils 8A of the driving units 61 to 63 have the same magnetic pole.

Accordingly, one of the driving units 61 to 63 can be prevented from interfering with the swing of the pendulum 5A by another driving unit. In addition, since the pendulum 5A can be swung by driving forces of the driving units 61 to 63, a rotational torque when the pendulum 5A swings can be increased. The plurality of driving units 61 to 63 may share one control unit.

Figure 12:
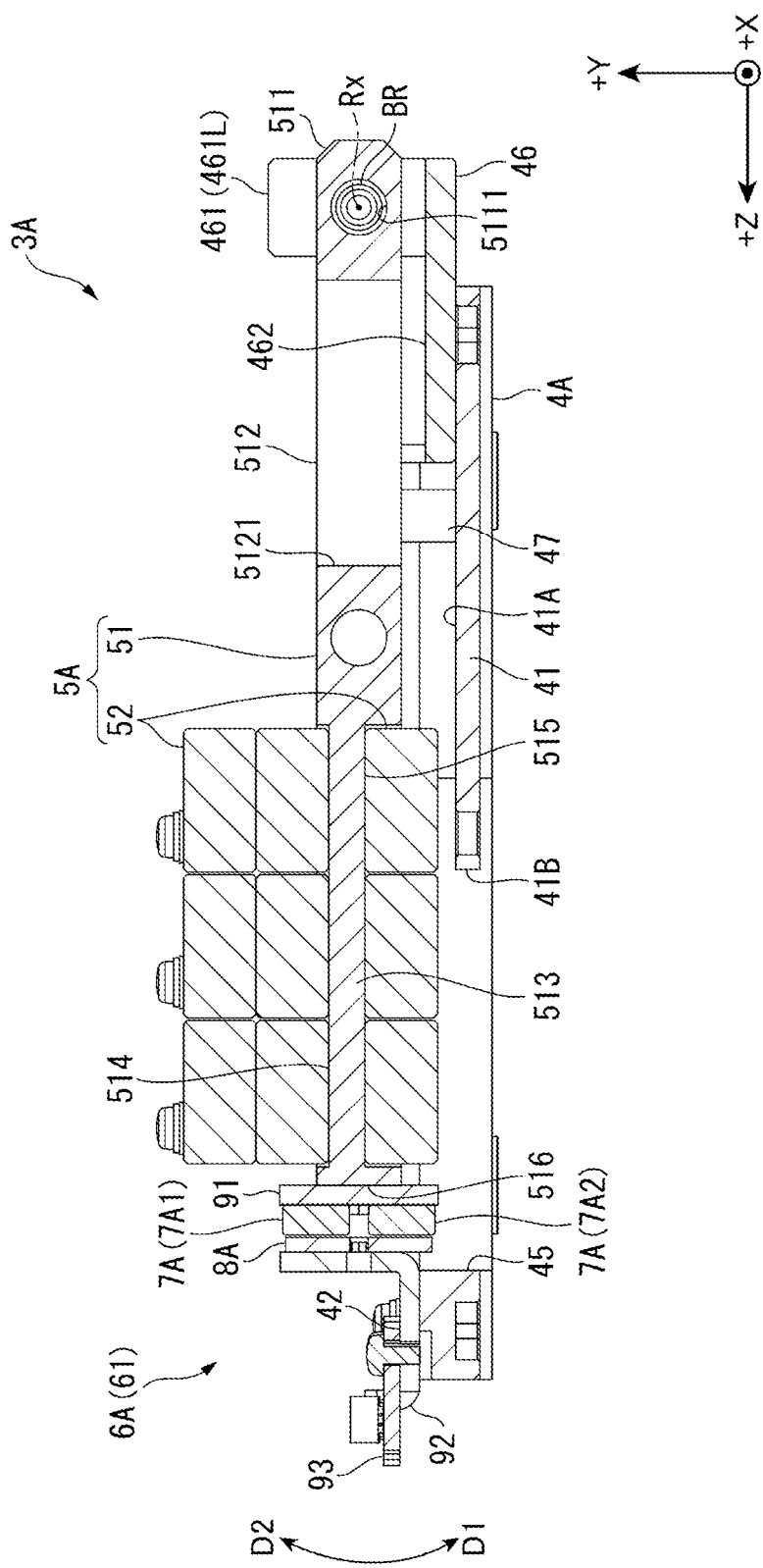
FIG. 12 is a cross-sectional view showing the vibration generation device in which the pendulum is disposed at a reference position according to the first embodiment.

Positional Correlation Between Configuration of Base and Configuration of Pendulum FIG. 12 is a view of a cross section of the vibration generation device 3A taken along a plane orthogonal to the rotation axis Rx as viewed from the +X direction. Specifically, FIG. 12 is a cross-sectional view showing the vibration generation device 3A in which the pendulum 5A is disposed at a reference position.

When the pendulum 5A does not swing, the pendulum 5A is disposed at a center of a swingable range of the pendulum 5A. As shown in FIGS. 5 and 12, when a position of the pendulum 5A at this time is defined as the reference position, the pendulum 5A extends in the +Z direction from the rotation axis Rx toward an outside of the support portion 41 at the reference position. At this time, as shown in FIGS. 5 and 12, the first side surface portion 516, which is the free end of the pendulum 5A, is provided at a position corresponding to the relief portion 45 when viewed from a position in the +Y direction facing the support portion 41. Specifically, portions of the enlarged portion 513 in the +Z direction including the first side surface portion 516, the second side surface portion 517, and the third side surface portion 518 are disposed at positions not overlapping with the base 4A when viewed from the +Y direction facing the support portion 41.

As shown in FIG. 12, an end portion 41B of the support portion 41 in the +Z direction and the coil 8A of the first driving unit 61 on a free end side are separated from each other in the +Z direction, and the relief portion 45 is provided between the end portion 41B and the coil 8A of the first driving unit 61. Therefore, between the end portion 41B and the coil 8A of the first driving unit 61, a space for avoiding the pendulum 5A at a time of swing is formed by the relief portion 45.

Figure 13:
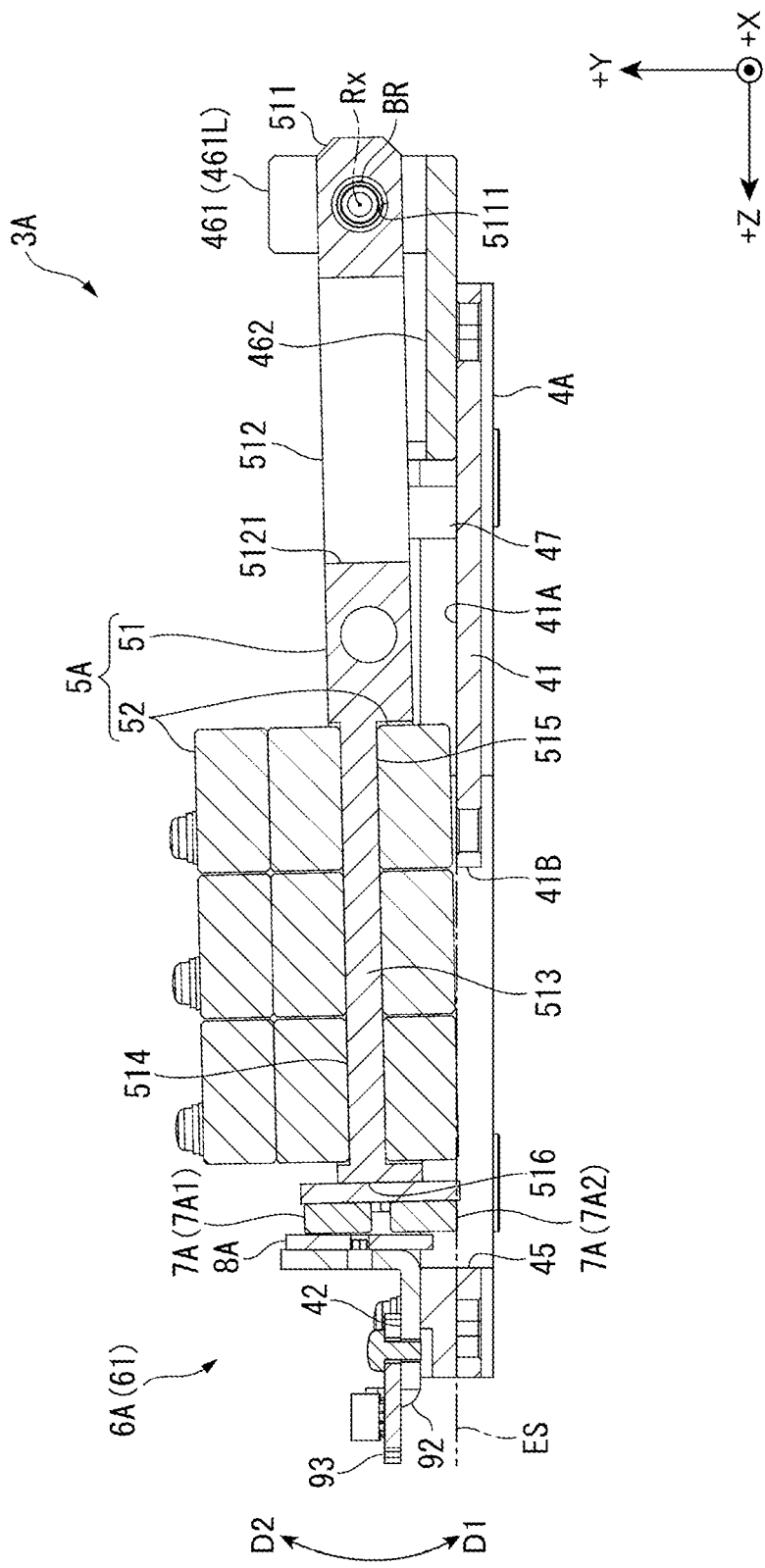
FIG. 13 is a cross-sectional view showing the vibration generation device when the pendulum moves most in a first rotation direction according to the first embodiment.

FIG. 13 is a view of a cross section of the vibration generation device 3A taken along the plane orthogonal to the rotation axis Rx as viewed from the +X direction. Specifically, FIG. 13 is a cross-sectional view showing the vibration generation device 3A when the pendulum 5A is moved most in a first rotation direction D1 in the swingable range of the pendulum 5A.

A rotation direction of the pendulum 5A when the first side surface portion 516, which is the free end, moves in the −Y direction is referred to as the first rotation direction D1. As shown in FIG. 13, when the pendulum 5A rotates most in the first rotation direction D1, a part of an extension surface ES of a facing surface 41A of the support portion 41 facing the pendulum 5A is included in the swingable range of the pendulum 5A. Therefore, the extension surface ES intersects with the weight portion 52, the magnet 7A, and the plate member 91. In other words, when viewed from the +Z direction, which is the extending direction of the pendulum 5A from the rotation axis Rx, the support portion 41 includes a portion overlapping with the weight portion 52, the magnet 7A, and the plate member 91 in the swingable range of the pendulum 5A. Therefore, the relief portion 45 can also be referred to as a housing portion that houses the weight portion 52 and the magnet 7A. The support portion 41 is provided outside the swingable range of the pendulum 5A when viewed from the +X direction along the rotation axis Rx.

As described above, when viewed from the position in the +Y direction facing the support portion 41, the portion of the enlarged portion 513 in the +Z direction including the first side surface portion 516 is disposed in the relief portion 45. Therefore, when the pendulum 5A rotates most in the first rotation direction D1, the pendulum 5A does not come into direct contact with the base 4A.

Figure 14:
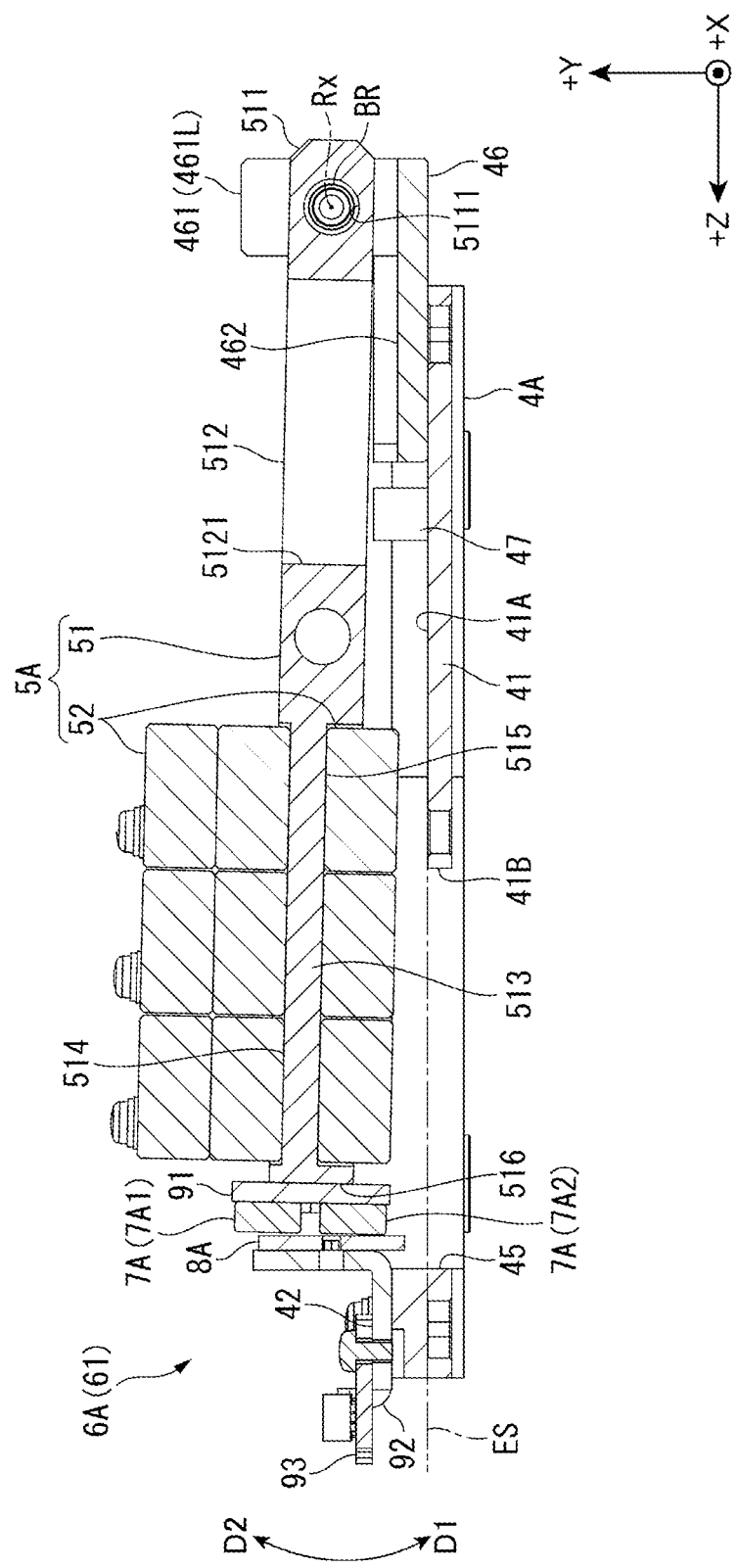
FIG. 14 is a cross-sectional view showing the vibration generation device when the pendulum moves most in a second rotation direction according to the first embodiment.

FIG. 14 is a view of a cross section of the vibration generation device 3A taken along the plane orthogonal to the rotation axis Rx as viewed from the +X direction. Specifically, FIG. 14 is a cross-sectional view showing the vibration generation device 3A when the pendulum 5A is moved most in the second rotation direction D2 in the swingable range of the pendulum 5A.

A rotation direction of the pendulum 5A when the first side surface portion 516, which is the free end, moves in the +Y direction is referred to as the second rotation direction D2. The second rotation direction D2 is a direction opposite from the first rotation direction D1. As shown in FIG. 14, when the pendulum 5A rotates most in the second rotation direction D2, the pendulum 5A is separated from the support portion 41 in the +Y direction. Therefore, when the pendulum 5A rotates most in the second rotation direction D2, the pendulum 5A does not come into direct contact with the support portion 41, hence the base 4A.

As shown in FIGS. 12 to 14, the buffer portion 47 is provided at the facing surface 41A. The buffer portion 47 is disposed between the support portion 41 and the pendulum 5A, and is in contact with a surface of the extending portion 512 of the pendulum 5A facing the support portion 41. The buffer portion 47 restricts the pendulum 5A from rotating in the first rotation direction more than necessary, and prevents the pendulum 5A from coming into direct contact with the support portion 41. The buffer portion 47 is implemented by a buffer member. The buffer member can be implemented by an urging member such as a compression coil spring or a plate spring, or can be implemented by an elastic member such as rubber.

Effects of First Embodiment

The projector 1 according to the embodiment described above has the following effects.

The projector 1, which is an electronic apparatus, includes the vibration reduction device 2. The vibration reduction device 2 includes the vibration generation device 3A, the detection unit 25, and the operation control unit 26. The detection unit 25 detects vibration of the lens barrel 121 which is an object. The operation control unit 26 causes the vibration generation device 3A to generate vibration opposite in phase from the vibration detected by the detection unit 25.

The vibration generation device 3A includes the base 4A, the pendulum 5A, and the driving unit 6A. The base 4A transmits the vibration generated by the vibration generation device 3A to the lens barrel 121 via the frame 23. The pendulum 5A is supported by the base 4A swingably around the rotation axis Rx. The driving unit 6A includes the magnet 7A and the coil 8A disposed to face the magnet 7A in a non-contact manner. The driving unit 6A swings the pendulum 5A. The magnet 7A, which is one member of the magnet 7A and the coil 8A, is provided at a position on the pendulum 5A away from the rotation axis Rx. The base 4A includes the support portion 41 that supports the pendulum 5A swingably around the rotation axis Rx. A part of the extension surface ES of the facing surface 41A of the support portion 41 facing the pendulum 5A is included in the swingable range of the pendulum 5A. The support portion 41 is provided outside the swingable range of the pendulum 5A when viewed from the +X direction along the rotation axis Rx.

According to such a configuration, the pendulum 5A can be prevented from coming into direct contact with the support portion 41 when the pendulum 5A swings. Therefore, a stroke of the pendulum 5A can be increased, the vibration generated by the swing of the pendulum 5A can be increased, and generation of noise when the pendulum 5A swings can be prevented.

Therefore, the generation of noise can be prevented, and the generated vibration can be increased. In addition, since generation of resonance caused by the direct contact between the pendulum 5A and the support portion 41 can be prevented, a magnitude of the vibration generated by swing of the pendulum 5A can be easily adjusted.

Further, since the vibration generation device 3A can generate the vibration opposite in phase from the vibration detected by the detection unit 25, the vibration of the lens barrel 121 in which the vibration reduction device 2 is installed can be reduced.

In the vibration generation device 3A, when viewed from the +Z direction, which is the extending direction of the pendulum 5A from the rotation axis Rx, the support portion 41 has a portion overlapping with the magnet 7A in the swingable range of the pendulum 5A.

According to such a configuration, the stroke of the pendulum 5A can be increased, and a dimension of the vibration generation device 3A in the +Y direction perpendicular to the support portion 41 can be reduced. Therefore, the generated vibration can be increased, and a size of the vibration generation device 3A can be reduced.

In the vibration generation device 3A, the pendulum 5A includes the arm 51 supported by the support portion 41 swingably around the rotation axis Rx, and the weight portion 52 provided at the arm 51. When viewed from the +Z direction, which is the extending direction of the arm 51 from the rotation axis Rx, the support portion 41 includes a portion overlapping with the weight portion 52 in the swingable range of the arm 51.

According to such a configuration, the stroke of the pendulum 5A can be increased, and the dimension of the vibration generation device 3A in the +Y direction perpendicular to the support portion 41 can be reduced. Therefore, the generated vibration can be increased, and the size of the vibration generation device 3A can be reduced.

The vibration generation device 3A includes the base 4A, the pendulum 5A, and the driving unit 6A. The base 4A transmits the vibration generated by the vibration generation device 3A to the lens barrel 121 via the frame 23. The pendulum 5A is supported by the base 4A swingably around the rotation axis Rx. The driving unit 6A includes the magnet 7A and the coil 8A disposed to face the magnet 7A in a non-contact manner. The driving unit 6A swings the pendulum 5A. The magnet 7A of the magnet 7A and the coil 8A is provided at a position on the pendulum 5A away from the rotation axis Rx. The base 4A includes the support portion 41 and the relief portion 45. The support portion 41 supports the pendulum 5A swingably around the rotation axis Rx. The relief portion 45 corresponds to the avoidance portion. The relief portion 45 avoids contact with the first side surface portion 516, which is the opposite-side free end of the pendulum 5A from the rotation axis Rx, when the pendulum 5A swings on the first side surface portion 516 side.

According to such a configuration, since the base 4A includes the relief portion 45, the direct contact of the first side surface portion 516 of the pendulum 5A with the base 4A can be avoided when the pendulum 5A swings. Therefore, the stroke of the pendulum 5A can be increased, the vibration generated by the swing of the pendulum 5A can be increased, and the generation of noise when the pendulum 5A swings can be prevented. In addition, since the generation of resonance caused by the direct contact between the first side surface portion 516 and the base 4A can be prevented, the magnitude of the vibration generated by swing of the pendulum 5A can be easily adjusted.

In the vibration generation device 3A, the support portion 41 has the facing surface 41A facing the pendulum 5A. The relief portion 45 is an opening penetrating the base 4A in the +Y direction perpendicular to the facing surface 41A.

According to such a configuration, the relief portion 45 can be easily configured. In addition, since the direct contact between the base 4A and the pendulum 5A can be prevented even when the stroke of the pendulum 5A is increased, the size of the vibration generation device 3A can be reduced.

In the vibration generation device 3A, the magnet 7A is disposed in the relief portion 45 when the pendulum 5A swings.

According to such a configuration, the magnet 7A can be prevented from coming into direct contact with the base 4A when the pendulum 5A swings. Accordingly, the stroke of the pendulum 5A can be increased, and the dimension of the vibration generation device 3A in the +Y direction perpendicular to the support portion 41 can be reduced. Therefore, the generated vibration can be increased, and the size of the vibration generation device 3A can be reduced.

In the vibration generation device 3A, the pendulum 5A includes the arm 51 supported by the support portion 41 swingably around the rotation axis Rx, and the weight portion 52 provided at the arm 51. The weight portion 52 is disposed in the relief portion 45 when the arm 51 swings.

According to such a configuration, since the weight portion 52 can be prevented from coming into direct contact with the base 4A when the pendulum 5A swings, the stroke of the pendulum 5A can be increased, and the dimension of the vibration generation device 3A in the +Y direction perpendicular to the support portion 41 can be reduced. Therefore, the generated vibration can be increased, and the size of the vibration generation device 3A can be reduced.

The vibration generation device 3A includes the base 4A, the pendulum 5A, and the driving unit 6A. The base 4A transmits the vibration generated by the vibration generation device 3A to the lens barrel 121 via the frame 23. The pendulum 5A is supported by the base 4A swingably around the rotation axis Rx. The driving unit 6A includes the magnet 7A and the coil 8A disposed to face the magnet 7A in a non-contact manner. The driving unit 6A swings the pendulum 5A. The base 4A includes the support portion 41 that supports the pendulum 5A. The magnet 7A of the magnet 7A and the coil 8A is provided at the first side surface portion 516, which is the tip end portion of the pendulum 5A in the extending direction of the pendulum 5A from the rotation axis Rx. The first side surface portion 516 is located outside the support portion 41 when viewed from a position facing the support portion 41 in the +Y direction. The end portion 41B of the support portion 41 in the extending direction of the pendulum 5A and the coil 8A of the magnet 7A and the coil 8A are spaced apart from each other in the +Z direction, which is the extending direction of the pendulum 5A.

According to such a configuration, since the end portion 41B of the support portion 41 and the coil 8A are spaced apart from each other in the +Z direction, a space in which the first side surface portion 516, which is the tip end portion, can move when the pendulum 5A swings can be formed between the end portion 41B and the coil 8A. Accordingly, the first side surface portion 516 can be prevented from coming into direct contact with the base 4A when the pendulum 5A swings.

Therefore, the stroke of the pendulum 5A can be increased, the vibration generated by the swing of the pendulum 5A can be increased, and the generation of noise when the pendulum 5A swings can be prevented. In addition, since the generation of resonance caused by the direct contact between the first side surface portion 516 and the base 4A can be prevented, the magnitude of the vibration generated by swing of the pendulum 5A can be easily adjusted.

The vibration generation device 3A includes the base 4A, the pendulum 5A, and the driving unit 6A. The base 4A transmits the vibration generated by the vibration generation device 3A to the lens barrel 121 via the frame 23. The pendulum 5A is supported by the base 4A swingably around the rotation axis Rx. The driving unit 6A includes the magnet 7A and the coil 8A disposed to face the magnet 7A in a non-contact manner. The driving unit 6A swings the pendulum 5A. The magnet 7A of the magnet 7A and the coil 8A is provided at a position on the pendulum 5A away from the rotation axis Rx. The base 4A includes the support portion 41 that supports the pendulum 5A swingably around the rotation axis Rx. The pendulum 5A extends to the outside of the support portion 41 when viewed from the position facing the support portion 41. The first side surface portion 516, which is the opposite-side free end of the pendulum 5A from the rotation axis Rx, is disposed at a position not overlapping with the base 4A when viewed from the position in the +Y direction facing the support portion 41.

According to such a configuration, the direct contact of the first side surface portion 516 of the pendulum 5A with the base 4A can be avoided when the pendulum 5A swings. Accordingly, since the stroke of the pendulum 5A can be increased, the vibration generated by the swing of the pendulum 5A can be increased, and the generation of noise when the pendulum 5A swings can be prevented. In addition, since the generation of resonance caused by the direct contact between the first side surface portion 516 and the base 4A can be prevented, the magnitude of the vibration generated by swing of the pendulum 5A can be easily adjusted.

The projector 1 includes the projection optical device 12 that projects an image. The vibration reduction device 2 is attached to the projection optical device 12.

According to such a configuration, the vibration of the projection optical device 12 due to an internal factor of the projector 1 or an external factor with respect to the projector 1 can be reduced. Therefore, the image projected onto the projection surface by the projection optical device 12 can be prevented from shaking.

First Modification of First Embodiment

In the vibration generation device 3A described above, the magnet 7A includes the first magnet member 7A1 and the second magnet member 7A2 separated from each other in the −Y direction from the first extending portion 8A1 toward the second extending portion 8A2. However, a magnet provided in the arm 51 is not limited thereto, and may be one magnet facing the first extending portion 8A1 and the second extending portion 8A2.

Figure 15:
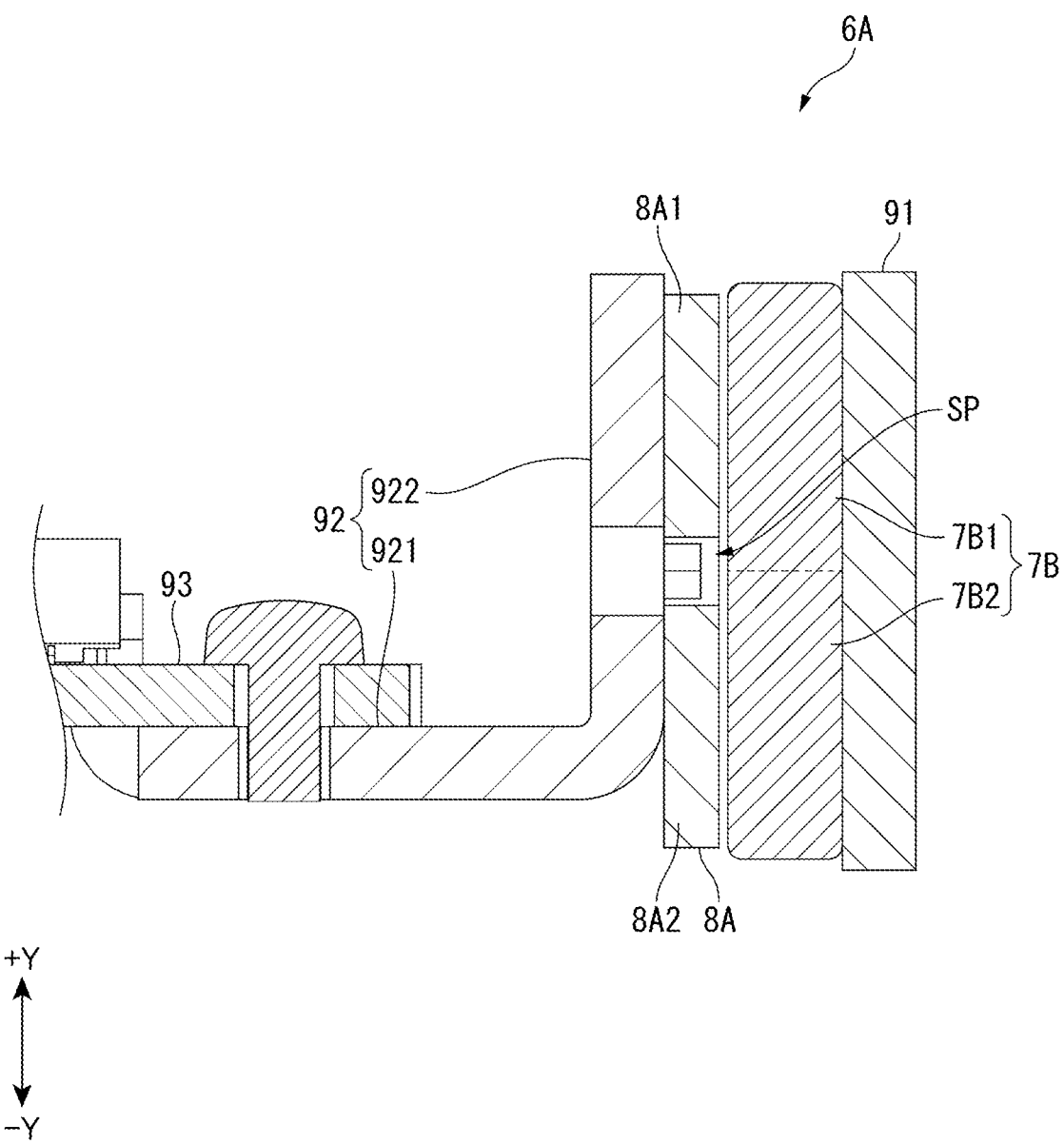
FIG. 15 is a cross-sectional view showing a driving unit according to a modification of the first embodiment.

FIG. 15 is a cross-sectional view showing a modification of the driving unit 6A. Specifically, FIG. 15 is a cross-sectional view showing a magnet 7B that is a deformation of the magnet 7A provided in the driving unit 6A.

For example, the driving unit 6A used in the vibration generation device 3A may use the magnet 7B shown in FIG. 15 instead of the magnet 7A. That is, at least one of the first driving unit 61, the second driving unit 62, and the third driving unit 63 may include the magnet 7B instead of the magnet 7A.

Unlike the magnet 7A including the first magnet member 7A1 and the second magnet member 7A2, the magnet 7B is formed by a single magnet member.

The magnet 7B is formed in a rectangular parallelepiped shape having a longitudinal axis substantially parallel to a longitudinal axis of the coil 8A, and is fixed to the plate member 91 to face the coil 8A in a non-contact manner. A dimension of the magnet 7B along the longitudinal axis is substantially the same as a dimension of the coil 8A along the longitudinal axis, and a dimension of the magnet 7B along the +Y direction orthogonal to the longitudinal axis is substantially the same as a dimension of the coil 8A along the +Y direction.

The magnet 7B includes a portion 7B1 facing the first extending portion 8A1 of the coil 8A and a portion 7B2 facing the second extending portion 8A2 of the coil 8A, and the portion 7B1 and the portion 7B2 are coupled to each other. A magnetic pole of a surface of the portion 7B1 facing the first extending portion 8A1 is different from a magnetic pole of a surface of the portion 7B2 facing the second extending portion 8A2. For example, the magnetic pole of the surface of the portion 7B1 facing the first extending portion 8A1 is an S pole, and the magnetic pole of the surface of the portion 7B2 facing the second extending portion 8A2 is an N pole.

The vibration generation device 3A including the driving unit 6A in which such a magnet 7B is used can also achieve the same effects as those described above.

Second Modification of First Embodiment

In the vibration generation device 3A described above, the driving unit 6A including the first driving unit 61, the second driving unit 62, and the third driving unit 63 includes the magnet 7A and the coil 8A. That is, the driving unit 6A includes the coil 8A implemented by an air-core coil.

However, the driving unit is not limited thereto, and one driving unit may include a plurality of coils.

For example, one driving unit may include a plurality of coils disposed in parallel along longitudinal axes of the coils, and at least one magnet provided corresponding to each of the plurality of coils.

In this case, similarly to the magnet 7A described above, the at least one magnet may be a plurality of magnets each including a first magnet member and a second magnet member provided corresponding to each of the plurality of coils. In this case, the first magnet member may face the first extending portion of the corresponding coil among the plurality of coils in a non-contact manner, and the second magnet member may face the second extending portion of the corresponding coil among the plurality of coils in a non-contact manner.

Alternatively, the at least one magnet may include one first magnet member disposed across the first extending portions of the plurality of coils and facing the first extending portions in a non-contact manner, and one second magnet member disposed across the second extending portions of the plurality of coils and facing the second extending portions in a non-contact manner.

Alternatively, similarly to the magnet 7B described above, the at least one magnet may be one magnet member including a portion facing the first extending portion of the corresponding coil among the plurality of coils in a non-contact manner and a portion facing the second extending portion of the corresponding coil among the plurality of coils in a non-contact manner.

Alternatively, the at least one magnet may be one magnet member including a portion disposed across the first extending portions of the plurality of coils and facing the first extending portions in a non-contact manner, and a portion facing the second extending portion of the corresponding coil among the plurality of coils in a non-contact manner.

Third Modification of First Embodiment

In the vibration generation device 3A described above, the arm 51 is supported swingably around the rotation axis Rx by the attachment portion 46 attached to the support portion 41 provided at an end portion of the base 4A in the −Z direction. In other words, the attachment portion 46 supporting the arm 51 swingably around the rotation axis Rx is attached to the support portion 41 provided at the end portion of the base 4A in the −Z direction. However, the support portion 41 is not limited thereto, and may be provided closer to the +Z direction than is the end portion of the base 4A in the −Z direction.

Figure 16:
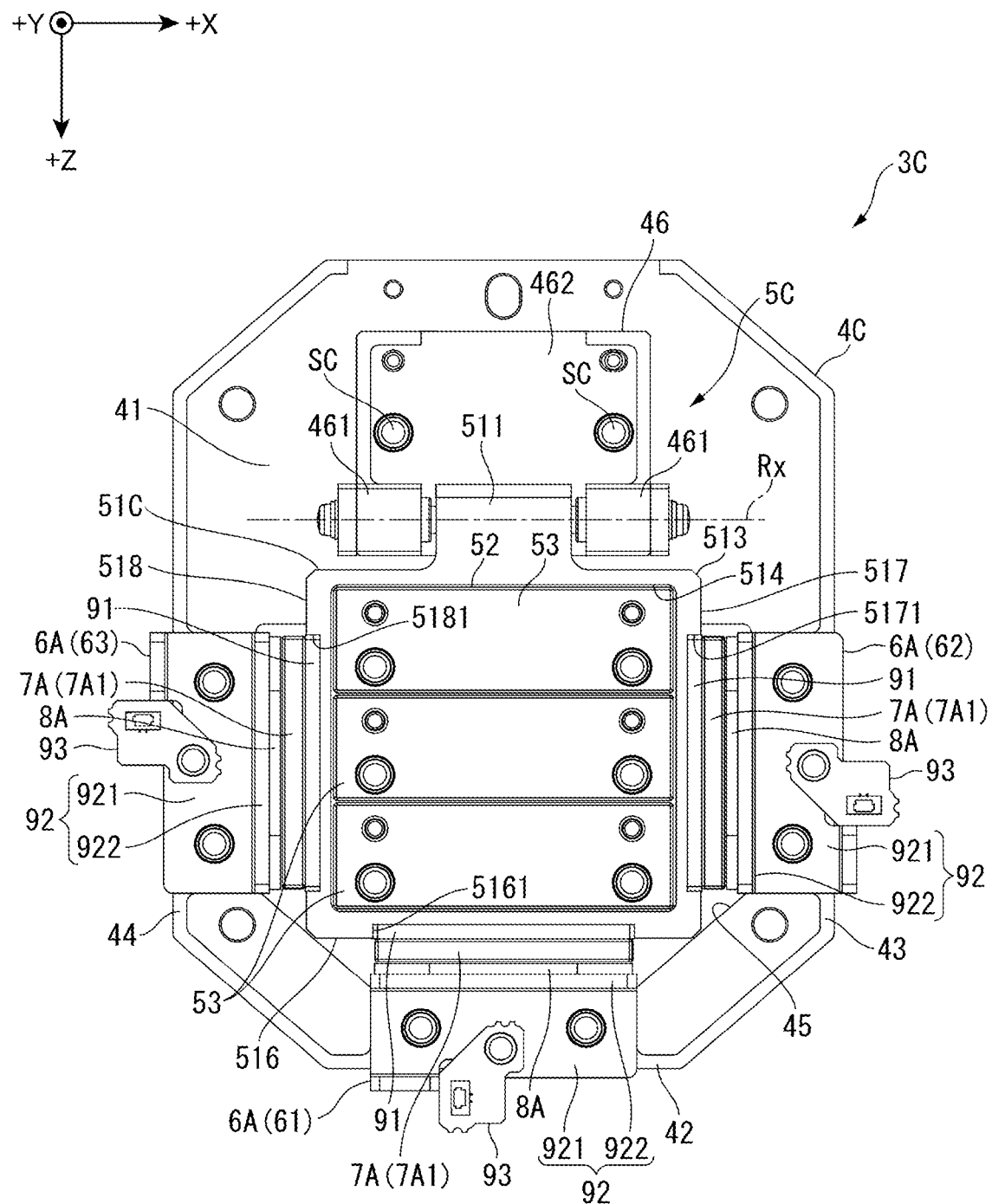
FIG. 16 is a plan view showing a vibration generation device according to a modification of the first embodiment.

FIG. 16 is a plan view showing a deformation of the vibration generation device 3A. Specifically, FIG. 16 is a plan view showing a base 4C and a pendulum 5C that are deformations of the base 4A and the pendulum 5A of the vibration generation device 3A.

For example, the vibration generation device 3A may use the base 4C and the pendulum 5C shown in FIG. 16 instead of the base 4A and the pendulum 5A. The base 4C is different from the base 4A in a position of the support portion 41 to which the attachment portion 46 is attached. The pendulum 5C includes an arm 51C that is different from the arm 51 in a dimension between the coupling portion 511 and the enlarged portion 513. In addition, a direction of the attachment portion 46 is different.

Specifically, in the base 4C, the support portion 41 is disposed closer to the +Z direction than is an end portion of the base 4C in the −Z direction. That is, the support portion 41 is provided at a position between the end portion of the base 4C in the −Z direction and the relief portion 45.

In addition, according to the position of the support portion 41 in the base 4C, a dimension between the coupling portion 511 and the enlarged portion 513 in the arm 51C is smaller than a dimension between the coupling portion 511 and the enlarged portion 513 in the arm 51. That is, the arm 51C does not include the extending portion 512 coupled from the coupling portion 511 to the enlarged portion 513 of the arm 51, and includes the enlarged portion 513 and a portion that is coupled from the enlarged portion 513 and is supported by the pair of rotation axis portions 461 of the attachment portion 46. An end portion of the enlarged portion 513 in the −Z direction is adjacent to the pair of rotation axis portions 461. Further, in the pendulum 5C, the attachment portion 46 is attached to the support portion 41 in a state of being rotated by 180° around an axis along the +Y direction.

According to the vibration generation device 3A in which such a base 4C and such a pendulum 5C are used, the same effects as those described above can be achieved, and a size of the vibration generation device 3A can be reduced.

Fourth Modification of First Embodiment

The vibration generation device 3A or 3C described above includes the first driving unit 61, the second driving unit 62, and the third driving unit 63 which are the driving units 6A. However, the vibration generation device 3A or 3C is not limited thereto, and may include one or two of the first driving unit 61, the second driving unit 62, and the third driving unit 63. For example, the vibration generation device 3A or 3C may include only the first driving unit 61, or may include two driving units including the second driving unit 62 and the third driving unit 63.

Figure 17:
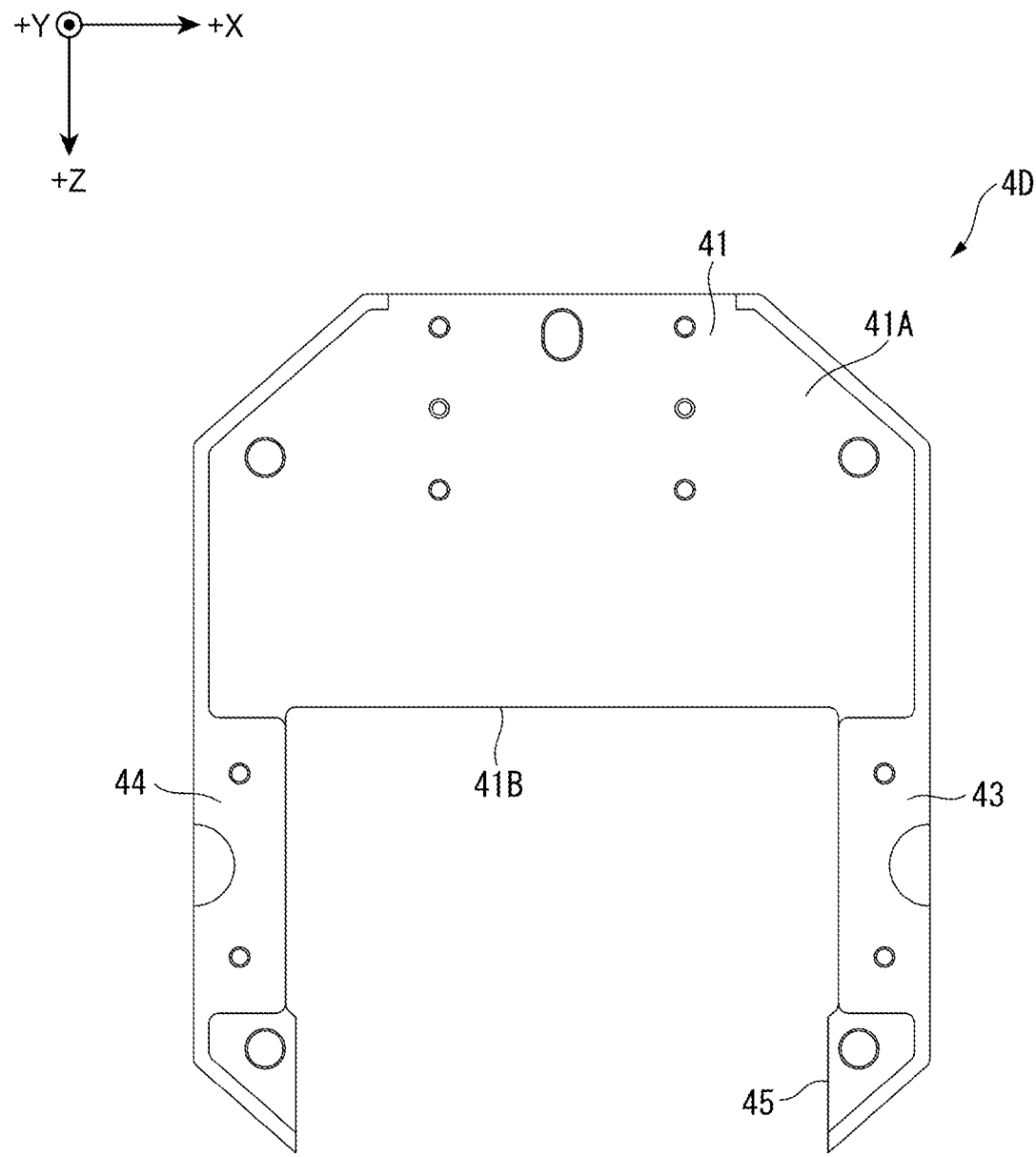
FIG. 17 is a plan view showing a base according to a modification of the first embodiment.

FIG. 17 is a plan view of a base 4D that is a deformation of the base 4A as viewed from the +Y direction.

For example, when the vibration generation device 3A does not include the first driving unit 61, the base 4D shown in FIG. 17 may be used instead of the base 4A.

The base 4D has the same configuration as that of the base 4A except that the base 4D does not include the fixing portion 42. That is, the base 4D includes the support portion 41, the fixing portions 43 and 44, and the relief portion 45, and further includes the attachment portion 46 and the buffer portion 47, which are not shown in FIG. 17. In the base 4D, the relief portion 45 is an opening such as a notch that penetrates the base 4D in the +Y direction in which the support portion 41 faces the pendulum 5A and is open in the +Z direction. The first side surface portion 516, which is a free end of the pendulum 5A supported by the base 4D, is disposed outside the base 4D when viewed from the +Y direction.

Figure 18:
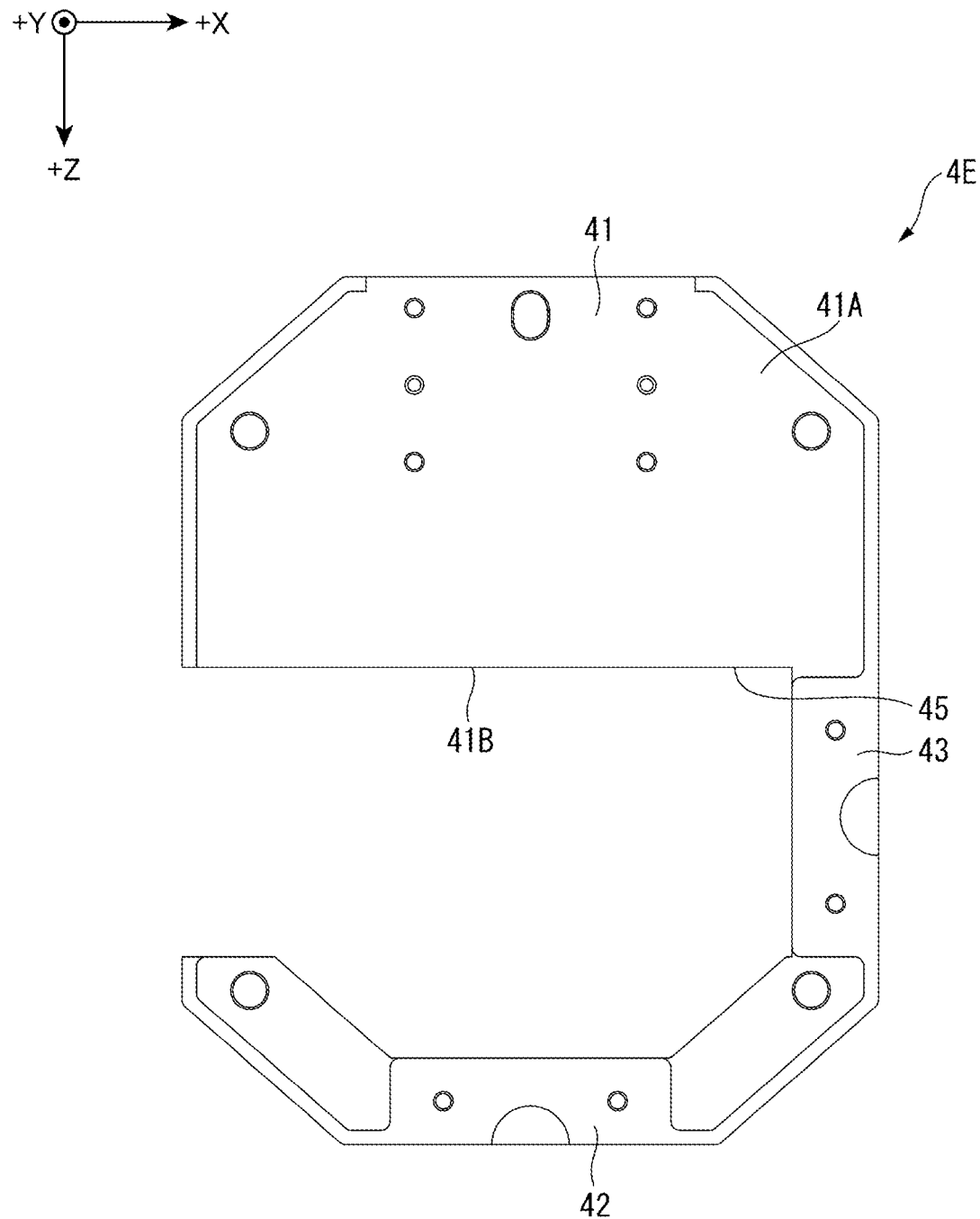
FIG. 18 is a plan view showing the base according to a modification of the first embodiment.

FIG. 18 is a plan view of a base 4E that is a deformation of the base 4A as viewed from the +Y direction.

For example, when the vibration generation device 3A does not include the third driving unit 63, the base 4E shown in FIG. 18 may be used instead of the base 4A.

The base 4E has the same configuration as that of the base 4A except that the base 4E does not include the fixing portion 44. That is, the base 4E includes the support portion 41, the fixing portions 42 and 43, and the relief portion 45, and further includes the attachment portion 46 and the buffer portion 47, which are not shown in FIG. 18. In the base 4E, the relief portion 45 is an opening such as a notch that penetrates the base 4E in the +Y direction in which the support portion 41 faces the pendulum 5A and is open in the −X direction. The first side surface portion 516, which is a free end of the pendulum 5A supported by the base 4E, is disposed outside the base 4E when viewed from the +Y direction.

Figure 19:
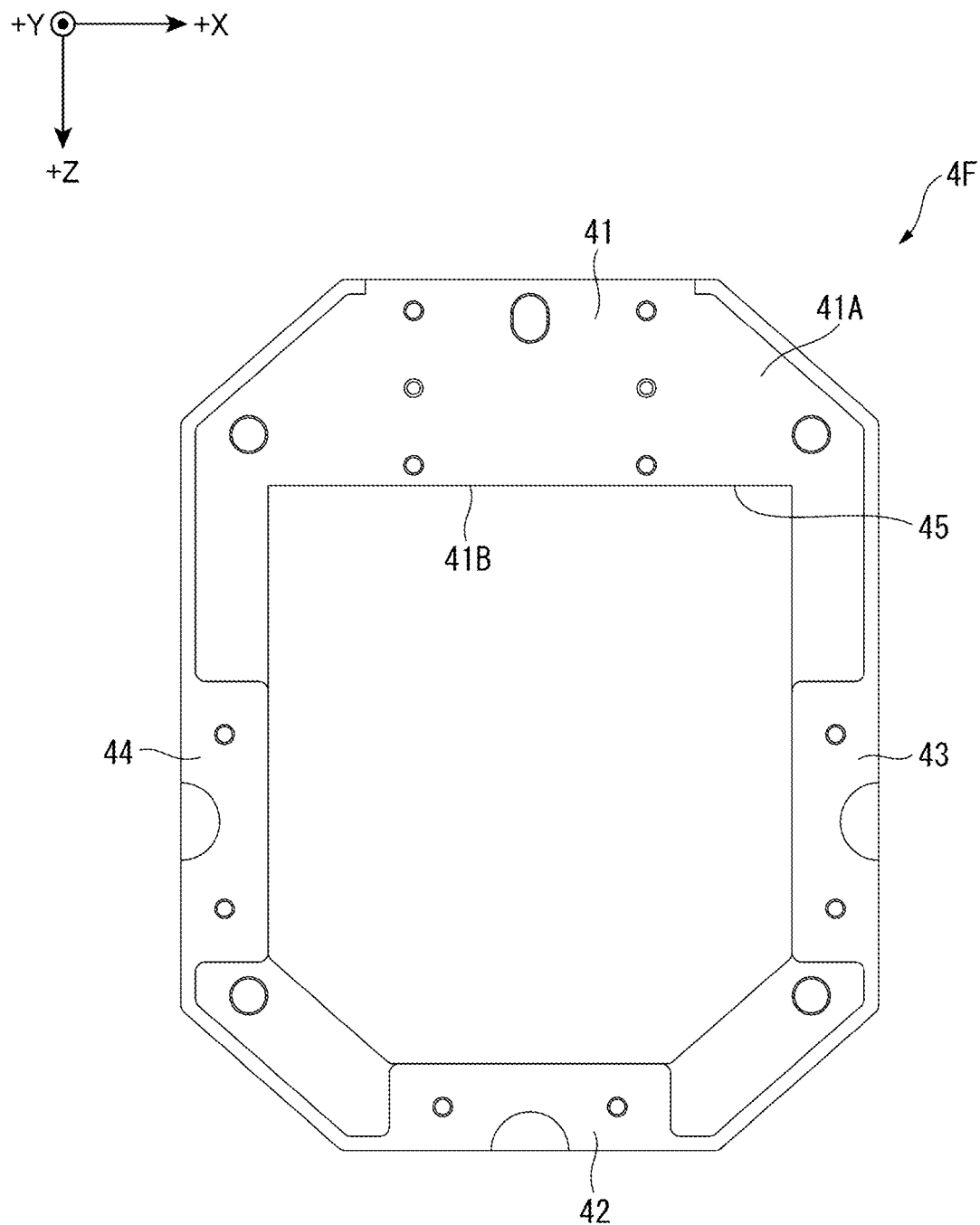
FIG. 19 is a plan view showing the base according to a modification of the first embodiment.

FIG. 19 is a plan view of a base 4F that is a deformation of the base 4A as viewed from the +Y direction.

When the vibration generation device 3A includes the driving units 61 to 63, the base 4F shown in FIG. 19 may be used instead of the base 4A.

The base 4F has the same configuration and function as those of the base 4A except that a dimension of the support portion 41 of the base 4F in the +Z direction is smaller than that of the support portion 41 of the base 4A. That is, the base 4F includes the support portion 41, the fixing portions 42 and 43, and the relief portion 45, and further includes the attachment portion 46 and the buffer portion 47, which are not shown in FIG. 19.

The same effects as those of the vibration generation device 3A including the base 4A can also be achieved by the vibration generation device 3A in which the base 4D, 4E, or 4F, instead of the base 4A, is used according to the number of the driving units 6A.

Fifth Modification of First Embodiment

In the vibration generation device 3A described above, the relief portion 45 is an opening penetrating the base 4A along the +Y direction perpendicular to the facing surface 41A. However, the relief portion is not limited thereto, and may be a recess that is recessed in the −Y direction, which is a direction opposite from the +Y direction facing the pendulum 5A and is open in the +Y direction.

Figure 20:
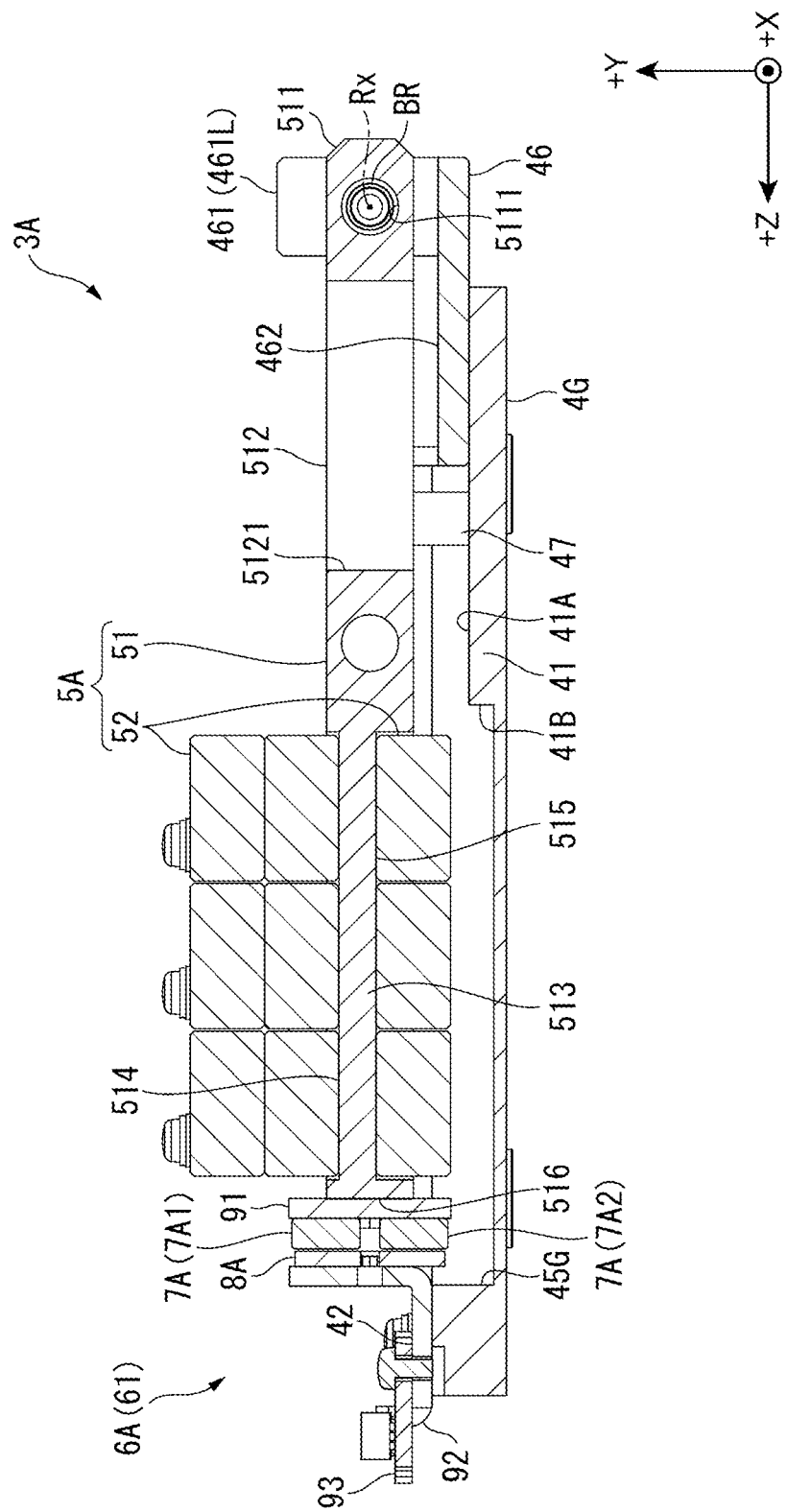
FIG. 20 is a cross-sectional view showing the vibration generation device according to a modification of the first embodiment.

FIG. 20 is a cross-sectional view showing a deformation of the vibration generation device 3A. Specifically, FIG. 20 is a view showing a cross section along a YZ plane in the vibration generation device 3A including a base 4G instead of the base 4A.

For example, the vibration generation device 3A may include the base 4G shown in FIG. 20 instead of the base 4A. The base 4G has the same configuration and function as those of the base 4A except that the base 4G includes a relief portion 45G instead of the relief portion 45. The relief portion 45G corresponds to an avoidance portion, and is a recess that is provided in the base 4G, recessed in the −Y direction, and open in the +Y direction. That is, the relief portion 45G is a recess that is provided in the base 4G and faces a portion on the first side surface portion 516 side, which is a free end of the pendulum 5A in the swinging direction.

Such a relief portion 45G is provided corresponding to a portion in the +Z direction including the first side surface portion 516 in the enlarged portion 513. Specifically, the relief portion 45G is a recess formed to such an extent that the enlarged portion 513 is disposed inside the relief portion 45G when viewed from the +Y direction.

According to the vibration generation device 3A including the base 4G including the relief portion 45G instead of the base 4A as well, the same effects as those of the vibration generation device 3A including the base 4A can be achieved, and the relief portion 45G can be easily configured.

Second Embodiment

Next, a second embodiment of the present disclosure will be described.

A projector according to the embodiment has the same configuration as that of the projector 1 according to the first embodiment, and is different from the projector 1 according to the first embodiment in that a coil constituting a driving unit is provided in a member different from the base. In the following description, the same or substantially the same parts as those described above are denoted by the same reference numerals, and the description thereof will be omitted.

Figure 21:
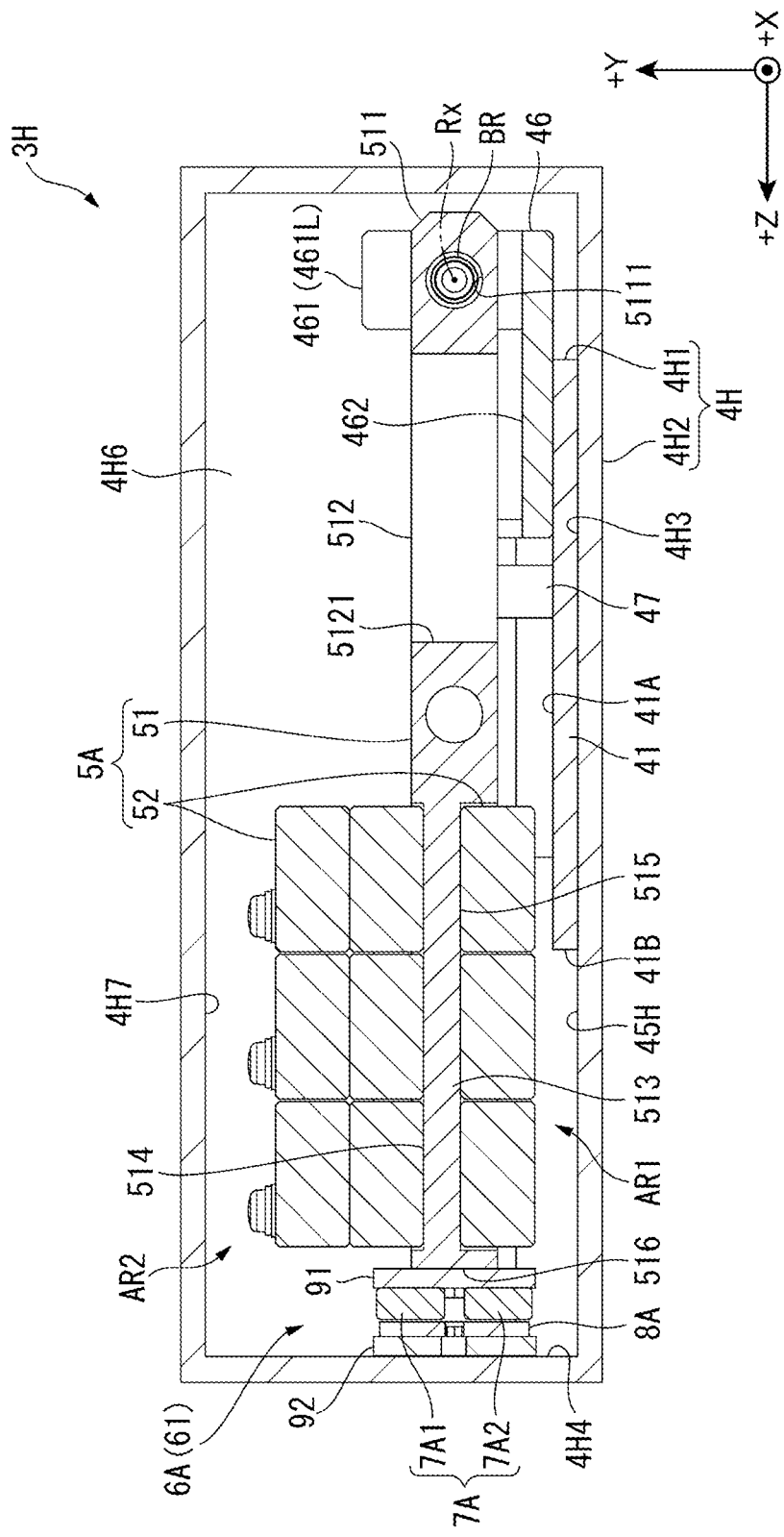
FIG. 21 is a cross-sectional view showing a vibration generation device according to a second embodiment.

FIG. 21 is a view showing a cross section of a vibration generation device 3H taken along a YZ plane according to the embodiment.

The projector and a vibration reduction device according to the embodiment have the same configuration and function as those of the projector 1 and the vibration reduction device 2 according to the first embodiment except that the projector and the vibration reduction device according to the embodiment include the vibration generation device 3H shown in FIG. 21 instead of the vibration generation device 3A.

The vibration generation device 3H has the same configuration as that of the vibration generation device 3A except that the vibration generation device 3H includes a base 4H instead of the base 4A. That is, the vibration generation device 3H includes the base 4H, the pendulum 5A, and three driving units 6A.

Similarly to the base 4A, the base 4H supports the pendulum 5A and the driving units 6A, and transmits vibration generated by the vibration generation device 3H to the lens barrel 121, which is an object, via the frame 23 in which the base 4H is provided. As shown in FIG. 21, the base 4H includes a first base 4H1 and a second base 4H2, and is configured by combining the first base 4H1 and the second base 4H2.

Figure 22:
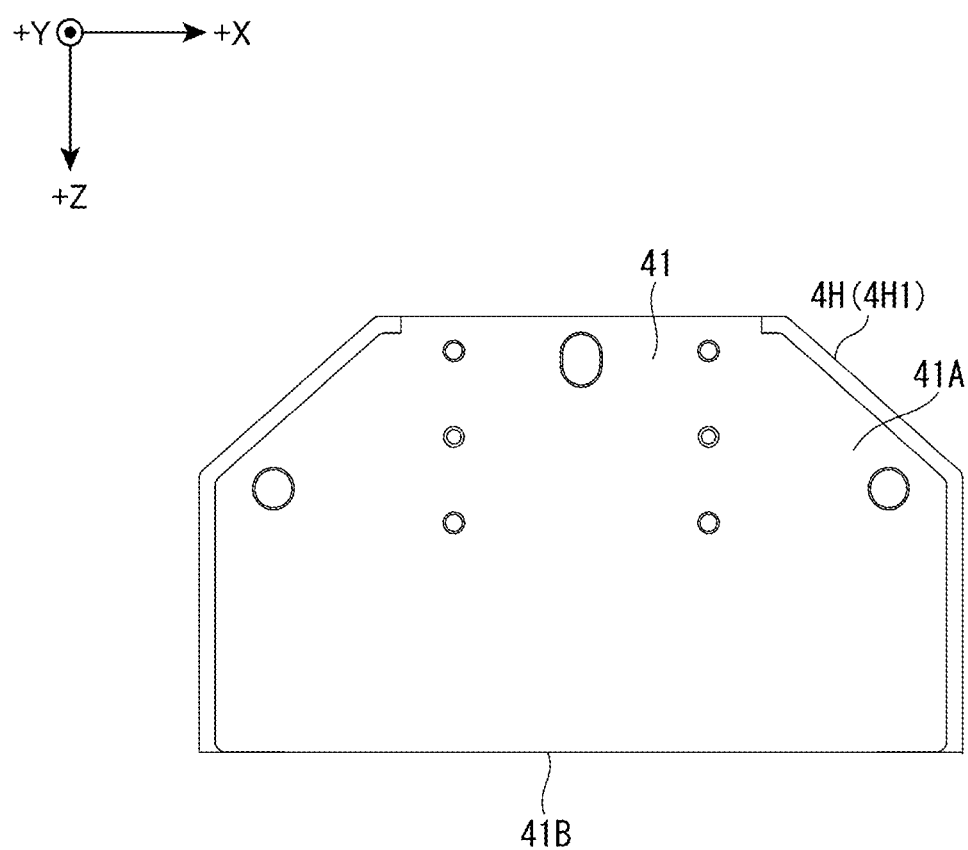
FIG. 22 is a plan view showing a first base according to the second embodiment.

FIG. 22 is a plan view showing the first base 4H1 as viewed from the +Y direction.

The first base 4H1 is a plate-shaped member formed in a flat plate shape, and supports the pendulum 5A swingably around the rotation axis Rx. As shown in FIG. 22, the first base 4H1 includes the support portion 41, and further includes the attachment portion 46 and the buffer portion 47, which are not shown. That is, the first base 4H1 does not include the fixing portions 42 to 44 to which the driving units 6A are fixed.

Although not shown, the pendulum 5A supported by the first base 4H1 extends from the rotation axis Rx to the +Z direction, which is an outside of the support portion 41. The first side surface portion 516, which is the free end of the pendulum 5A, is disposed outside the first base 4H1 when viewed from the +Y direction.

The second base 4H2 is a housing in which the first base 4H1 is attached. Specifically, the second base 4H2 is a housing formed in a substantially rectangular parallelepiped shape when viewed from the +X direction, and houses the first base 4H1, the pendulum 5A, the driving units 6A, and the like therein. The first base 4H1 is disposed such that a surface of the support portion 41 in the −Y direction is in contact with an installation surface 4H3 facing the +Y direction among inner surfaces of the second base 4H2.

The coils 8A of the driving units 6A are attached to the inner surfaces of the second base 4H2. Specifically, when the vibration generation device 3H includes the driving units 61 to 63, the holding member 92 that holds the coil 8A of the first driving unit 61 is attached to an inner surface 4H4 in the +Z direction among the inner surfaces of the second base 4H2. The holding member 92 which holds the coil 8A of the second driving unit 62 is attached to an inner surface in the +X direction (not shown) among the inner surfaces of the second base 4H2. The holding member 92 which holds the coil 8A of the third driving unit 63 is attached to an inner surface 4H6 in the −X direction among the inner surfaces of the second base 4H2.

The base 4H includes a relief portion 45H formed by the support portion 41 of the first base 4H1 and the installation surface 4H3 of the second base 4H2.

The relief portion 45H is a recess recessed in the −Y direction from the end portion 41B of the support portion 41 in the +Z direction. In other words, the relief portion 45H is a stepped portion formed by the installation surface 4H3 located in the −Y direction with respect to the support portion 41. Similarly to the relief portion 45, the relief portion 45H is an avoidance portion that avoids direct contact of the first side surface portion 516, which is a free end of the pendulum 5A, when the pendulum 5A swings. A first swingable region AR1 in which the pendulum 5A is swingable without interfering with the base 4H is provided in the relief portion 45H.

An inner surface 4H7 facing the −Y direction among the inner surfaces of the second base 4H2 is sufficiently separated from a surface of the pendulum 5A facing the +Y direction. Therefore, a second swingable region AR2 in which the pendulum 5A is swingable without interfering with the base 4H is provided between the inner surface 4H7 and the pendulum 5A.

Such a second base 4H2 may be used as the frame 23. In such a case, since there is no need to separately provide the frame 23, a configuration of the vibration reduction device 2 including the vibration generation device 3H can be simplified.

Effects of Second Embodiment

The projector and the vibration reduction device including the vibration generation device 3H described above can achieve the same effects as those of the projector 1 and the vibration reduction device 2 including the vibration generation device 3A according to the first embodiment, and can also achieve the following effects.

In the vibration generation device 3H, the base 4H constitutes the housing that houses the pendulum 5A. The relief portion 45H which is the avoidance portion is provided at a surface of the base 4H facing a swinging direction of the pendulum 5A.

According to such a configuration, even when the base 4H constitutes the housing that houses the pendulum 5A, the direct contact of the free end of the pendulum 5A with the base 4H can be avoided when the pendulum 5A swings. Accordingly, a stroke of the pendulum 5A can be increased, and a dimension of the vibration generation device 3H in the +Y direction perpendicular to the support portion 41 can be reduced. Therefore, the generated vibration can be increased, and a size of the vibration generation device 3H can be reduced.

First Modification of Second Embodiment

The vibration generation device 3H described above may be deformed according to the contents described in the modifications of the first embodiment described above. For example, at least one of the driving units provided in the vibration generation device 3H may be a driving unit including the magnet 7B instead of the magnet 7A. The vibration generation device 3H may include at least one of the first driving unit 61, the second driving unit 62, and the third driving unit 63, and other driving units may be omitted.

Second Modification of Second Embodiment

Figure 23:
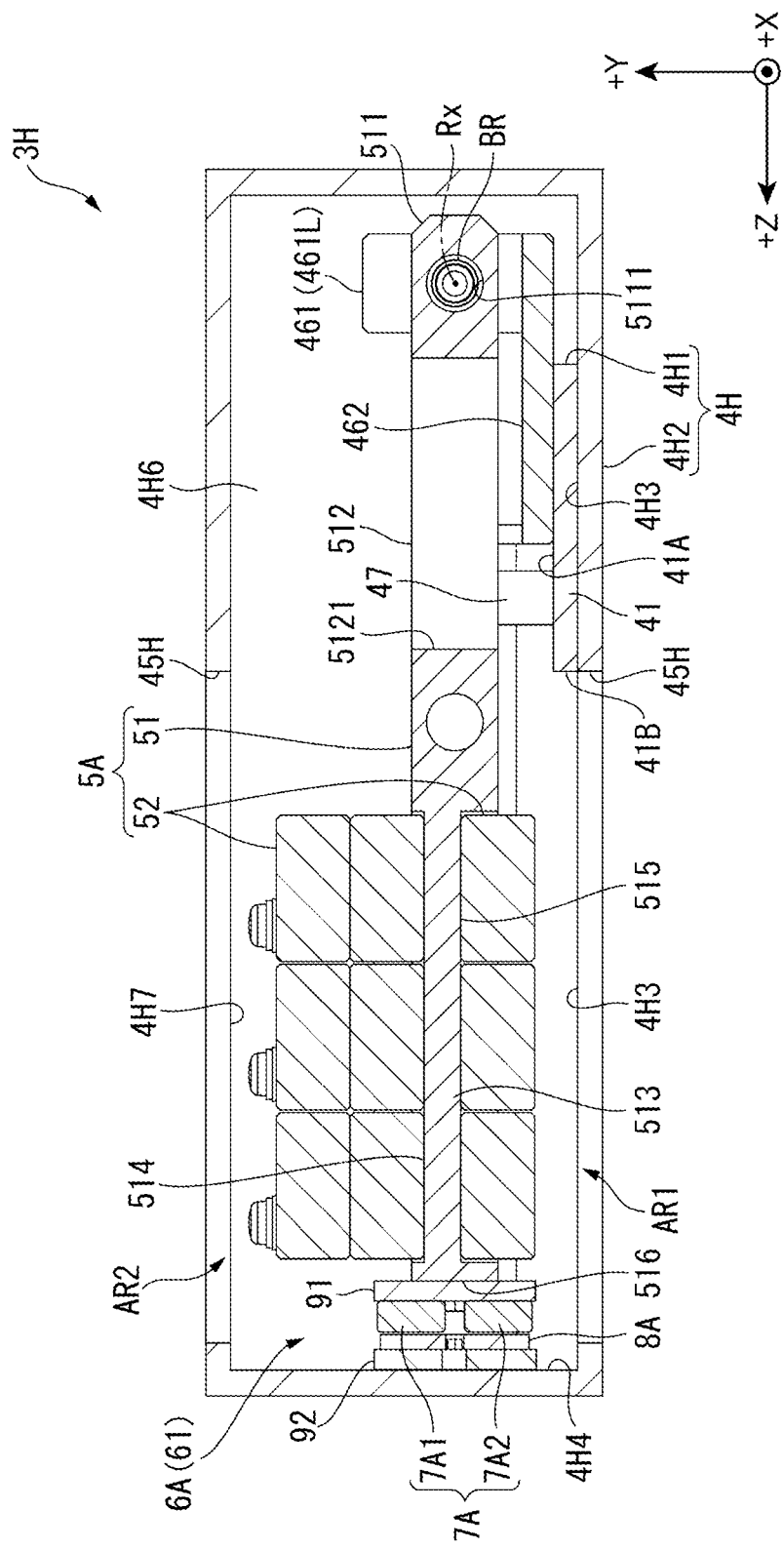
FIG. 23 is a cross-sectional view showing a vibration generation device according to a modification of the second embodiment.

FIG. 23 is a cross-sectional view showing a deformation of the vibration generation device 3H.

In the vibration generation device 3H described above, the relief portion 45H is a recess or a stepped portion formed by the support portion 41 and the installation surface 4H3 coming into contact with each other. However, the relief portion 45H is not limited thereto, and as shown in FIG. 23, may be an opening provided in a surface of the second base 4H2 in the −Y direction according to the first side surface portion 516 which is a free end of the pendulum 5A. An opening may be provided in a surface of the second base 4H2 in the +Y direction according to the first side surface portion 516, and the opening may be another relief portion 45H. At this time, when a dimension of the support portion 41 in the +Z direction is reduced similarly to the base 4F shown in FIG. 19, a stroke of the pendulum 5A can be increased, and a dimension of the vibration generation device 3H in the +Y direction can be further reduced.

The relief portion 45H may be a recess recessed in a direction opposite from a direction facing the pendulum 5A.

Modification of Embodiment

The present disclosure is not limited to the above-described embodiments, and modifications, improvements, and the like within a range in which an object of the present disclosure can be achieved are included in the present disclosure.

In the embodiments described above, when viewed from the +Z direction which is an extending direction of the pendulum 5A or 5C from the rotation axis Rx, the support portion 41 includes a portion overlapping with the magnet 7A and the weight portion 52 in a swingable range of the pendulum 5A or 5C. However, the support portion 41 is not limited thereto, and may not include the portion overlapping with the magnet 7A and the weight portion 52 in the swingable range of the pendulum 5A or 5C.

Depending on a stroke of the pendulum 5A or 5C, the support portion 41 may include a portion overlapping with the arm 51 or 51C in the swingable range of the pendulum 5A or 5C.

In the embodiments described above, among the magnets 7A provided at the pendulum 5A, the magnet 7A provided at the first side surface portion 516 which is a tip end portion of the pendulum 5A is disposed in the relief portion 45 when the pendulum 5A or 5C swings. The relief portion 45, 45G, or 45H corresponds to an avoidance portion. However, the magnet 7A is not limited thereto, and may not be disposed in the relief portion 45, 45G, or 45H.

When the coil 8A constituting the first driving unit 61 is provided at the pendulum 5A or 5C, the coil 8A may be disposed in the relief portion 45, 45G, or 45H or may not be disposed in the relief portion 45, 45G, or 45H when the pendulum 5A or 5C swings.

In the embodiments described above, the weight portion 52 provided at the arm 51 or 51C is disposed in the relief portion 45 when the pendulum 5A or 5C swings. The relief portion 45, 45G, or 45H corresponds to an avoidance portion. However, the weight portion 52 is not limited thereto, and may not be disposed in the relief portion 45, 45G, or 45H.

In the embodiments described above, the weight portion 52 includes the weight portion member 53 attached to at least one of the disposition portions 514 and 515 of the arm 51 or 51C. However, the weight portion 52 is not limited thereto, and may be formed integrally with the arm 51 or 51C.

In a case of such a configuration, when viewed from the +Z direction which is the extending direction of the arm 51 or 51C from the rotation axis Rx, the support portion 41 includes a portion overlapping with the arm 51 or 51C in a swingable range of the arm 51 or 51C. That is, the support portion 41 provided outside the swingable range of the pendulum 5A or 5C includes the portion overlapping with the arm 51 or 51C when viewed from the extending direction of the pendulum from the rotation axis Rx. In this case, the stroke of the pendulum 5A or 5C can be increased, and a dimension of the vibration generation device in a direction perpendicular to the support portion 41 can be reduced. Therefore, the generated vibration can be increased, and a size of the vibration generation device can be reduced.

Further, in this case, the arm 51 or 51C is disposed in the relief portion 45, 45G, or 45H which is the avoidance portion at a time of swinging. Accordingly, since the arm 51 or 51C can be prevented from coming into direct contact with the base when the pendulum 5A or 5C swings, the stroke of the pendulum 5A or 5C can be increased, and the dimension of the vibration generation device in the direction perpendicular to the support portion 41 can be reduced. Therefore, the generated vibration can be increased, and the size of the vibration generation device can be reduced.

A pendulum may be selected from a plurality of types of pendulums that differ in at least one of a position, a weight, and a shape of the weight portion 52, and may be used in the vibration generation device.

In the embodiments described above, the attachment portion 46 that supports the pendulum 5A or 5C swingably around the rotation axis Rx is detachably attached to the support portion 41. However, the attachment portion 46 is not limited thereto, and may be provided integrally with the support portion 41.

In the embodiments described above, in the magnet 7A and the coil 8A constituting the driving unit 6A, the magnet 7A is attached to the pendulum 5A or 5C, and the coil 8A is attached to the base 4A, 4C, 4D, 4E, 4F, or 4G or the second base 4H2. However, the magnet and the coil are not limited thereto, the coil may be attached to the pendulum, and the magnet may be attached to the base or the second base.

Further, when one member of the magnet and the coil is attached to a member different from the pendulum, a type of the member to which the one member is attached does not matter.

In the embodiments described above, the magnets 7A of the driving units 61 to 63 are attached to the side surface portions 516 to 518 of the enlarged portion 513. However, the magnet 7A is not limited thereto, and a position at which the magnet 7A is provided in the pendulum is not limited as long as the pendulum can be swung around the rotation axis Rx. The same applies to a case where the coil 8A instead of the magnet 7A is provided at the pendulum.

For example, when the pendulum includes an extending portion extending from the rotation axis Rx in the −Z direction, the magnet 7A or the coil 8A may be provided at the extending portion.

In the embodiments described above, examples in which the vibration reduction device 2 including the vibration generation device 3A, 3C, or 3H is applied to the projector 1 which is an electronic apparatus are described. However, the electronic apparatus to which the vibration reduction device 2 is applied is not limited to the projector, and the vibration reduction device 2 may be applied to other electronic apparatuses. A position at which the vibration reduction device 2 is attached may not be the projection optical device 12, and may be another position.

Further, the vibration generation device according to the present disclosure may be used alone as a device that generates vibration, or may be used in the electronic apparatus.

Summary of Present Disclosure

The present disclosure will be summarized as follows.

A vibration generation device according to a first aspect of the present disclosure includes: a base configured to transmit vibration to an object; a pendulum supported by the base swingably around a rotation axis; and a driving unit including a magnet, and a coil disposed to face the magnet in a non-contact manner, and configured to swing the pendulum. One member of the magnet and the coil is provided at a position on the pendulum away from the rotation axis. The base includes a support portion supporting the pendulum swingably around the rotation axis. A part of an extension surface of a facing surface of the support portion facing the pendulum is included in a swingable range of the pendulum. The support portion is provided outside the swingable range of the pendulum when viewed along the rotation axis.

According to such a configuration, the support portion swingably supporting the pendulum is provided outside the swingable range of the pendulum. Therefore, the pendulum can be prevented from coming into direct contact with the support portion when the pendulum swings. Accordingly, a stroke of the pendulum can be increased, and vibration generated by the swing of the pendulum can be increased.

Further, since the pendulum and the support portion do not come into direct contact with each other when the pendulum swings, generation of noise when the pendulum swings can be prevented.

Therefore, the generation of noise can be prevented, and the generated vibration can be increased. In addition, since generation of resonance caused by the direct contact between the pendulum and the support portion can be prevented, a magnitude of the vibration generated by swing of the pendulum can be easily adjusted.

In the first aspect, the support portion may include a portion overlapping with the one member in the swingable range of the pendulum when viewed from an extending direction of the pendulum from the rotation axis.

According to such a configuration, since the support portion provided outside the swingable range of the pendulum includes the portion overlapping with the one member provided at the pendulum when viewed from the extending direction of the pendulum from the rotation axis, a stroke of the pendulum can be increased, and a dimension of the vibration generation device in a direction perpendicular to the support portion can be reduced. Therefore, the generated vibration can be increased, and a size of the vibration generation device can be reduced.

In the first aspect, the pendulum may include an arm supported by the support portion swingably around the rotation axis, and a weight portion provided at the arm. The support portion may include a portion overlapping with the weight portion in a swingable range of the arm when viewed from an extending direction of the arm from the rotation axis.

According to such a configuration, since the support portion provided outside the swingable range of the pendulum includes the portion overlapping with the weight portion of the pendulum when viewed from the extending direction of the pendulum from the rotation axis, the stroke of the pendulum can be increased, and the dimension of the vibration generation device in the direction perpendicular to the support portion can be reduced. Therefore, the generated vibration can be increased, and the size of the vibration generation device can be reduced.

In the first aspect, the pendulum may include an arm supported by the support portion swingably around the rotation axis. The support portion may include a portion overlapping with the arm in a swingable range of the arm when viewed from an extending direction of the arm from the rotation axis.

According to such a configuration, since the support portion provided outside the swingable range of the pendulum includes the portion overlapping with the arm when viewed from the extending direction of the arm from the rotation axis, the stroke of the pendulum can be increased, and the dimension of the vibration generation device in the direction perpendicular to the support portion can be reduced. Therefore, the generated vibration can be increased, and the size of the vibration generation device can be reduced.

A vibration generation device according to a second aspect of the present disclosure includes: a base configured to transmit vibration to an object; a pendulum supported by the base swingably around a rotation axis; and a driving unit including a magnet, and a coil disposed to face the magnet in a non-contact manner, and configured to swing the pendulum. One member of the magnet and the coil is provided at a position on the pendulum away from the rotation axis. The base includes a support portion supporting the pendulum swingably around the rotation axis, and an avoidance portion, configured to avoid contact with an opposite-side free end of the pendulum from the rotation axis when the pendulum swings, on the free end side.

According to such a configuration, since the base includes the avoidance portion, direct contact of the free end of the pendulum with the base can be avoided when the pendulum swings. Accordingly, the stroke of the pendulum can be increased, and the vibration generated by the swing of the pendulum can be increased.

Further, since the free end does not come into direct contact with the base when the pendulum swings, the generation of noise when the pendulum swings can be prevented.

Therefore, the generation of noise can be prevented, and the generated vibration can be increased. In addition, since generation of resonance caused by the contact between the free end and the base can be prevented, the magnitude of the vibration generated by the swing of the pendulum can be easily adjusted.

In the second aspect, the support portion may have a facing surface facing the pendulum. The avoidance portion may be an opening penetrating the base in a direction perpendicular to the facing surface.

According to such a configuration, the avoidance portion can be configured easily. In addition, since the direct contact between the base and the pendulum can be prevented even when the stroke of the pendulum is increased, the size of the vibration generation device can be reduced.

In the second aspect, the support portion may have a facing surface facing the pendulum. The avoidance portion may be a recess provided at the base facing the free end in a swinging direction of the pendulum.

According to such a configuration, the avoidance portion can be configured easily.

In the second aspect, the one member may be disposed in the avoidance portion when the pendulum swings.

According to such a configuration, since the one member can be prevented from coming into direct contact with the base when the pendulum swings, the stroke of the pendulum can be increased, and the dimension of the vibration generation device in the direction perpendicular to the support portion can be reduced. Therefore, the generated vibration can be increased, and the size of the vibration generation device can be reduced.

In the second aspect, the pendulum may include an arm supported by the support portion swingably around the rotation axis, and a weight portion provided at the arm. The weight portion may be disposed in the avoidance portion when the arm swings.

According to such a configuration, since the weight portion can be prevented from coming into direct contact with the base when the pendulum swings, the stroke of the pendulum can be increased, and the dimension of the vibration generation device in the direction perpendicular to the support portion can be reduced. Therefore, the generated vibration can be increased, and the size of the vibration generation device can be reduced.

In the second aspect, the pendulum may include an arm supported by the support portion swingably around the rotation axis. The arm may be disposed in the avoidance portion when the arm swings.

According to such a configuration, since the arm can be prevented from coming into direct contact with the base when the pendulum swings, the stroke of the pendulum can be increased, and the dimension of the vibration generation device in the direction perpendicular to the support portion can be reduced. Therefore, the generated vibration can be increased, and the size of the vibration generation device can be reduced.

In the second aspect, the base may constitute a housing that houses the pendulum. The avoidance portion may be provided at a surface of the base facing a swinging direction of the pendulum.

According to such a configuration, when the base constitutes the housing that houses the pendulum, the direct contact of the free end of the pendulum with the base can be avoided when the pendulum swings. Accordingly, the stroke of the pendulum can be increased, and the dimension of the vibration generation device in the direction perpendicular to the support portion can be reduced. Therefore, the generated vibration can be increased, and the size of the vibration generation device can be reduced.

A vibration generation device according to a third aspect of the present disclosure includes: a base configured to transmit vibration to an object; a pendulum supported by the base swingably around a rotation axis; and a driving unit including a magnet, and a coil disposed to face the magnet in a non-contact manner, and configured to swing the pendulum. The base includes a support portion supporting the pendulum. One member of the magnet and the coil is provided at a tip end portion of the pendulum in an extending direction of the pendulum from the rotation axis. The tip end portion is located outside the support portion when viewed from a position facing the support portion. An end portion of the support portion and the other member of the magnet and the coil are spaced apart from each other.

According to such a configuration, since the end portion of the support portion and the other member are spaced apart from each other, a space in which the tip end portion can move can be formed between the end portion and the other member when the pendulum swings. Accordingly, since the tip end portion of the pendulum can be prevented from coming into direct contact with the base when the pendulum swings, the stroke of the pendulum can be increased, and the vibration generated by the swing of the pendulum can be increased.

Further, since the tip end portion does not come into direct contact with the base when the pendulum swings, the generation of noise when the pendulum swings can be prevented.

Therefore, the generation of noise can be prevented, and the generated vibration can be increased. In addition, since generation of resonance caused by the direct contact between the tip end portion and the base can be prevented, the magnitude of vibration generated by the swing of the pendulum can be easily adjusted.

A vibration generation device according to a fourth aspect of the present disclosure includes: a base configured to transmit vibration to an object; a pendulum supported by the base swingably around a rotation axis; and a driving unit including a magnet, and a coil disposed to face the magnet in a non-contact manner, and configured to swing the pendulum. One of the magnet and the coil is provided at a position on the pendulum away from the rotation axis. The base includes a support portion supporting the pendulum swingably around the rotation axis. The pendulum extends to an outside of the support portion when viewed from a position facing the support portion. An opposite-side free end of the pendulum from the rotation axis is disposed at a position not overlapping with the base when viewed from the position facing the support portion.

According to such a configuration, since the free end of the pendulum is disposed outside the base when viewed from the position facing the support portion, the direct contact of the free end of the pendulum with the base can be avoided when the pendulum swings. Accordingly, the stroke of the pendulum can be increased, and the vibration generated by the swing of the pendulum can be increased.

Further, since the free end does not come into direct contact with the base when the pendulum swings, the generation of noise when the pendulum swings can be prevented.

Therefore, the generation of noise can be prevented, and the generated vibration can be increased. In addition, since generation of resonance caused by the direct contact between the free end and the base can be prevented, the magnitude of the vibration generated by the swing of the pendulum can be easily adjusted.

A vibration reduction device according to a fifth aspect of the present disclosure includes: the vibration generation device according to the first to the fourth aspects; a detection unit configured to detect vibration of the object; and an operation control unit configured to cause the vibration generation device to generate vibration opposite in phase from the vibration detected by the detection unit.

According to such a configuration, the same effects as those of the vibration generation device according to the first aspect can be achieved. Further, since the vibration generation device can generate the vibration opposite in phase from the vibration detected by the detection unit, the vibration of an installation target of the vibration reduction device can be reduced.

An electronic apparatus according to a sixth aspect of the present disclosure includes: the vibration reduction device according to the fifth aspect.

According to such a configuration, the same effects as those of the vibration reduction device according to the fifth aspect can be achieved, and the vibration of the electronic apparatus can be reduced.

In the sixth aspect, the electronic apparatus may further include a projection optical device configured to project an image. The vibration reduction device may be attached to the projection optical device.

According to such a configuration, vibration of the projection optical device caused by an internal factor of the electronic apparatus or an external factor to the electronic apparatus can be reduced. Therefore, an image projected onto a projection surface by the projection optical device can be prevented from shaking.

What is claimed is:

1. A vibration generation device comprising:
a base configured to transmit vibration to an object;
a pendulum supported by the base swingably around a rotation axis; wherein
the pendulum includes an arm supported by a support portion in the base;
the support portion supports the pendulum and the arm swingably around the rotation axis; and
the support portion includes a portion overlapping with the arm in a swingable range of the arm when viewed from an extending direction of the arm from the rotation axis; and
a driving unit including
a magnet, and
a coil disposed to face the magnet in a non-contact manner, and configured to swing the pendulum, wherein
a first member of the magnet and the coil is provided at a position on the pendulum away from the rotation axis,
a part of an extension surface of a facing surface of the support portion facing the pendulum is included in a swingable range of the pendulum, and
the support portion is provided outside the swingable range of the pendulum when viewed along the rotation axis.

2. The vibration generation device according to claim 1, wherein the pendulum includes:
a weight portion provided at the arm, and
the support portion includes a portion overlapping with the weight portion in a swingable range of the arm when viewed from an extending direction of the arm from the rotation axis.

3. A vibration reduction device comprising:
the vibration generation device according to claim 1;
a detection unit configured to detect vibration of the object; and
an operation control unit configured to cause the vibration generation device to generate vibration opposite in phase from the vibration detected by the detection unit.

4. An electronic apparatus comprising:
the vibration reduction device according to claim 3.

5. The electronic apparatus according to claim 4, further comprising:
a projection optical device configured to project an image, wherein
the vibration reduction device is attached to the projection optical device.

6. A vibration generation device comprising:
a base configured to transmit vibration to an object;
a pendulum supported by the base swingably around a rotation axis; wherein the pendulum includes an arm supported by a support portion in the base;
the support portion supports the pendulum and the arm swingably around the rotation axis; and
the support portion includes a portion overlapping with the arm in a swingable range of the arm when viewed from an extending direction of the arm from the rotation axis; and
a driving unit including
a magnet, and
a coil disposed to face the magnet in a non-contact manner, and configured to swing the pendulum, wherein
a first member of the magnet and the coil is provided at a position on the pendulum away from the rotation axis, and
the base includes
an avoidance portion, configured to avoid contact with an opposite-side free end of the pendulum from the rotation axis when the pendulum swings, on the free end side.

7. The vibration generation device according to claim 6, wherein
the support portion has a facing surface facing the pendulum, and
the avoidance portion is an opening penetrating the base in a direction perpendicular to the facing surface.

8. The vibration generation device according to claim 6, wherein
the support portion has a facing surface facing the pendulum, and
the avoidance portion is a recess provided at the base facing the free end in a swinging direction of the pendulum.

9. The vibration generation device according to claim 6, wherein
the first member is disposed in the avoidance portion when the pendulum swings.

10. The vibration generation device according to claim 6, wherein
the pendulum includes
a weight portion provided at the arm, and
the weight portion is disposed in the avoidance portion when the arm swings.

11. The vibration generation device according to claim 6, wherein
the arm is disposed in the avoidance portion when the arm swings.

12. The vibration generation device according to claim 6, wherein
the base constitutes a housing that houses the pendulum, and
the avoidance portion is provided at a surface of the base facing a swinging direction of the pendulum.

13. A vibration generation device comprising:
a base configured to transmit vibration to an object;
a pendulum supported by the base swingably around a rotation axis; wherein
the pendulum includes an arm supported by a support portion in the base;
the support portion supports the pendulum and the arm swingably around the rotation axis; and
the support portion includes a portion overlapping with the arm in a swingable range of the arm when viewed from an extending direction of the arm from the rotation axis; and
a driving unit including
a magnet, and
a coil disposed to face the magnet in a non-contact manner, and configured to swing the pendulum, wherein
the base includes a support portion supporting the pendulum,
a first member of the magnet and the coil is provided at a tip end portion of the pendulum in an extending direction of the pendulum from the rotation axis,
the tip end portion is located outside the support portion when viewed from a position facing the support portion, and
an end portion of the support portion and a second member of the magnet and the coil are spaced apart from each other.

14. The vibration generation device according to claim 13, wherein the pendulum includes a weight portion provided at the arm, and the support portion includes a portion overlapping with the weight portion in a swingable range of the arm when viewed from an extending direction of the arm from the rotation axis.

15. A vibration generation device comprising:
a base configured to transmit vibration to an object;
a pendulum supported by the base swingably around a rotation axis; wherein
the pendulum includes an arm supported by a support portion in the base;
the support portion supports the pendulum and the arm swingably around the rotation axis; and
the support portion includes a portion overlapping with the arm in a swingable range of the arm when viewed from an extending direction of the arm from the rotation axis; and
a driving unit including
a magnet, and
a coil disposed to face the magnet in a non-contact manner, and configured to swing the pendulum, wherein
one of the magnet and the coil is provided at a position on the pendulum away from the rotation axis,
the pendulum extends to an outside of the support portion when viewed from a position facing the support portion, and
an opposite-side free end of the pendulum from the rotation axis is disposed at a position not overlapping with the base when viewed from the position facing the support portion.

16. The vibration generation device according to claim 13, further comprising an avoidance portion, configured to avoid contact with an opposite-side free end of the pendulum from the rotation axis when the pendulum swings, on the free end side.

17. The vibration generation device according to claim 16, wherein the pendulum includes an arm supported by the support portion swingably around the rotation axis, and
a weight portion provided at the arm, and
the weight portion is disposed in the avoidance portion when the arm swings.

18. The vibration generation device according to claim 15, wherein the pendulum includes a weight portion provided at the arm, and the support portion includes a portion overlapping with the weight portion in a swingable range of the arm when viewed from an extending direction of the arm from the rotation axis.

19. The vibration generation device according to claim 15, further comprising an avoidance portion, configured to avoid contact with an opposite-side free end of the pendulum from the rotation axis when the pendulum swings, on the free end side.

20. The vibration generation device according to claim 19, wherein the pendulum includes an arm supported by the support portion swingably around the rotation axis, and
a weight portion provided at the arm, and
the weight portion is disposed in the avoidance portion when the arm swings.

* * * * *